US011815202B2

(12) United States Patent
    Coffland et al.

(10) Patent No.: US 11,815,202 B2
(45) Date of Patent: Nov. 14, 2023

(54) COMPRESSION FITTING WITH VISUAL TORQUE INDICATOR

(71) Applicant: The Boeing Company, Chicago, IL (US)

(72) Inventors: Donald Wayne Coffland, Seattle, WA (US); Ryan Kody Coello, Renton, WA (US); Andrew Benjamin Clements, Maple Valley, WA (US); Ronald Lawrence Clements, Kent, WA (US); Christian James Tom, Kent, WA (US); David James Linnenkamp, Renton, WA (US)

(73) Assignee: The Boeing Company, Chicago, IL (US)

( * ) Notice: Subject to any disclaimer, the term of this patent is extended or adjusted under 35 U.S.C. 154(b) by 98 days.

(21) Appl. No.: 17/465,663

(22) Filed: Sep. 2, 2021

(65) Prior Publication Data
    US 2022/0136627 A1    May 5, 2022

Related U.S. Application Data

(60) Provisional application No. 63/108,930, filed on Nov. 3, 2020.

(51) Int. Cl.
    *F16L 19/02*        (2006.01)
(52) U.S. Cl.
    CPC ....... *F16L 19/0206* (2013.01); *F16L 2201/10* (2013.01)
(58) Field of Classification Search
    CPC ..... F16L 19/005; F16L 2201/10; F16L 19/02; F16L 19/0206; F16L 19/025; F16L 19/061; F16L 37/23; F16D 7/00
    See application file for complete search history.

(56) References Cited

U.S. PATENT DOCUMENTS

| 4,457,469 A | * | 7/1984 | Ratchford | ............ | H01R 13/622 |
| | | | | | 439/312 |
| 5,094,491 A | * | 3/1992 | Berghammer | ........ | F16L 19/005 |
| | | | | | 285/179 |
| 5,215,336 A | * | 6/1993 | Worthing | ............... | F16L 19/005 |
| | | | | | 411/937 |
| 5,871,239 A | * | 2/1999 | Boscaljon | ............. | F16L 19/005 |
| | | | | | 285/354 |

(Continued)

FOREIGN PATENT DOCUMENTS

| FR | 2786847 A1 | 6/2000 |
| FR | 2967229 A1 | 5/2012 |

OTHER PUBLICATIONS

U.S. Appl. No. 16/674,819, filed Nov. 5, 2019.
European Search Report; Application EP21205748; dated Feb. 23, 2022.

*Primary Examiner* — David Bochna
(74) *Attorney, Agent, or Firm* — Duft & Bornsen, PC

(57) ABSTRACT

A tubing nut fastener having elements that are partially rotatable with respect to each other. In between the rotatable elements, engagement members (e.g., balls) are captured within interior channels. The partially rotatable elements include permanent markings or other non-removable visual indicators, which varies spatially depending on whether the tubing nut fastener is in a torqued state or an un-torqued state, thereby providing a visual indication of the status of the tubing nut fastener.

20 Claims, 20 Drawing Sheets

(56) References Cited

U.S. PATENT DOCUMENTS

| | | | |
|---|---|---|---|
| 6,050,609 A * | 4/2000 | Boscaljon | F16L 19/005 285/357 |
| 7,222,889 B2 * | 5/2007 | Breay | F16L 19/005 285/354 |
| 9,666,973 B1 * | 5/2017 | Strahl | H01R 13/622 |
| 10,598,204 B2 * | 3/2020 | Nguyen | F16B 21/073 |
| 10,895,337 B2 * | 1/2021 | Jahnke | F16L 19/025 |
| 2013/0076030 A1 * | 3/2013 | Fog | F16L 19/07 285/362 |
| 2014/0284918 A1 * | 9/2014 | Kumar | F16L 19/025 29/428 |
| 2015/0028587 A1 * | 1/2015 | Marc | F16L 19/005 285/354 |
| 2017/0030148 A1 | 2/2017 | Demissie et al. | |

* cited by examiner

COMPRESSION FITTING WITH VISUAL TORQUE INDICATOR

RELATED APPLICATIONS

This non-provisional patent application claims priority to U.S. Provisional Patent Application No. 63/108,930 filed on Nov. 3, 2020, which is incorporated by reference as if fully provided herein.

FIELD

This disclosure relates to the field of tubing connectors, and in particular, to compression fittings used to connect tubing to threaded fittings.

BACKGROUND

A B-nut is a component of a type of compression fitting that is used on aircraft to connect tubing to a threaded fitting. For example, hydraulic tubing in an aircraft may be terminated at hydraulically-actuated actuators using a B-nut that engages a threaded fitting at the hydraulic actuator.

B-nuts are often used with a ferrule to terminate tubing at a connector. The ferrule is inserted into the B-nut, and the combination of the B-nut and ferrule are slid over an end of a tube. The B-nut includes interior threads, which are threaded onto exterior threads of the connector, and the ferrule is either welded or swaged in place. As the B-nut is tightened, the interior threads of the B-nut wind onto the exterior threads of the connector until torqued. The B-nut does not provide a visual indication of whether it is torqued or un-torqued, as the B-nut is free to rotate with respect to the connector during the torquing process. Thus, visually determining whether the B-nut is torqued or un-torqued is not possible.

During an aircraft manufacturing process, tubing is often installed, loosened, and adjusted to achieve the final fit requirements in the aircraft, which may make it difficult to determine if a B-nut has been torqued or remains un-torqued. The result is that during a pressurized fluid test on the tubing, leaks may occur where the tubing terminates at the B-nut, which may entail a messy clean-up and possible replacement of components that were damaged by the pressurized fluid (e.g., hydraulic fluid).

Based on the forgoing discussion, it therefore remains desirable to improve the fabrication process for aircraft or other machines, and in particular, to improve processes that ensure tube compression fittings have been, and remain, in a torqued state.

SUMMARY

In the embodiments described herein, a tubing nut fastener includes two separate elements that are partially rotatable with respect to each other. In between the rotatable elements, engagement members (e.g., balls) are captured within interior channels. Both of the partially rotatable elements include a permanent marking or other non-removable visual indicator, which varies spatially depending on whether the tubing nut fastener is in a torqued state or an un-torqued state, thereby providing a simple visual indication of the status of the tubing nut fastener and a technical benefit over prior compression nuts.

One embodiment comprises a tubing nut fastener that includes a nut, a main body, and engagement members. The nut has first channels disposed circumferentially and spaced radially along an inner surface proximate to a first end, and an inner ring radially projecting from the inner surface proximate to a second end. The main body has a third end and a fourth end, and includes a reference mark disposed on an outer surface, and second channels disposed circumferentially and spaced radially apart along the outer surface proximate to the fourth end. The inner surface of the nut surrounds the outer surface of the main body at the fourth end. The engagement members are disposed within the first channels and the second channels between the nut and the main body.

In an embodiment, the first channels vary in depth along a length.

In an embodiment, the second channels vary in depth along a length.

In an embodiment, the main body includes an inner surface having interior threads proximate to the third end, and the first channels have centerlines with non-zero angles that are based on a thread pitch of the interior threads.

In an embodiment, the main body includes an inner surface having interior threads proximate to the third end, and the second channels have centerlines with non-zero angles that are based on a thread pitch of the interior threads.

In an embodiment, the engagement members comprise balls, and the nut includes ports in the inner surface that extend from the first channels to the first end, and are sized to receive the balls.

In an embodiment, a spatial relationship between the reference mark and a visual indicator on the nut indicates whether the tubing nut fastener is in a torqued state or an un-torqued state.

Another embodiment comprises a method of fabricating a tubing nut fastener, comprising providing a nut having first channels disposed circumferentially and spaced radially along an inner surface proximate to a first end, and an inner ring radially projecting from the inner surface proximate to a second end. The method further comprises providing a main body having a third end and a fourth end, and including a reference mark disposed on an outer surface proximate, and second channels disposed circumferentially and spaced radially along the outer surface proximate to the fourth end. The method further comprises engaging the first channels with the second channels using engagement members.

Another embodiment comprises a method of terminating tubing at a connecter using a tubing nut fastener. The method comprises sliding a ferrule into the tubing nut fastener, where the tubing nut fastener includes a nut having first channels disposed circumferentially along an inner surface, a main body having second channels disposed circumferentially along an outer surface, and engagement members disposed within the first channels and the second channels between the nut and the main body. The method further comprises installing the ferrule and tubing nut fastener onto an end of the tubing, and rotating the tubing nut fastener to engage interior threads of the main body with exterior threads of the connector. The method further comprises applying a torque to rotate the nut with respect to the main body to reduce a relative depth of the first channels and the second channels across the engagement members and generate a torsional spring force which biases the nut in a direction of rotation with respect to the main body.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

DETAILED DESCRIPTION

Figure 1:
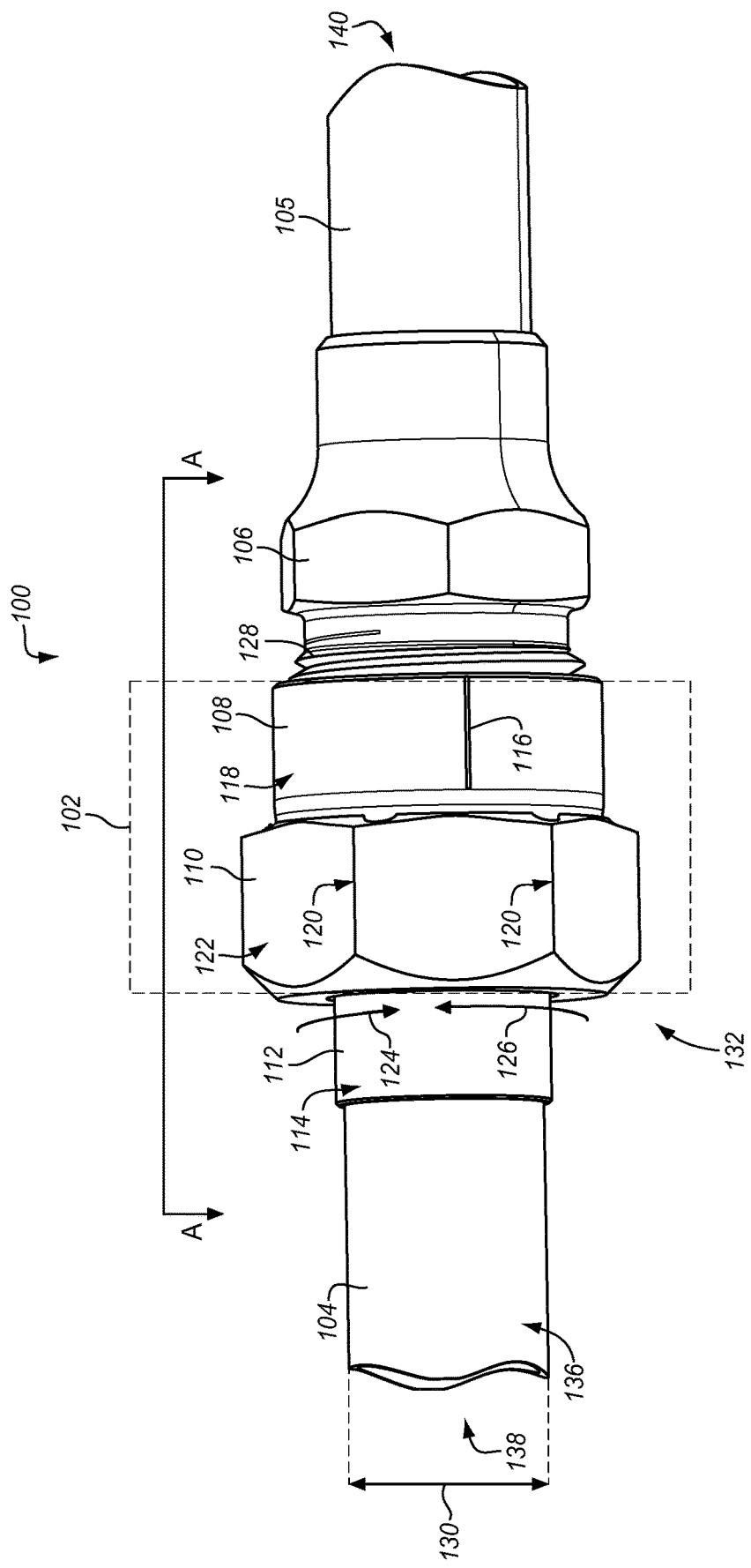
FIGS. 1-4 are isometric views of a compression assembly in an illustrative embodiment.

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

FIGS. 1-4 are isometric views of a compression assembly 100 in an illustrative embodiment. In this embodiment, compression assembly 100 includes a tubing nut fastener 102, tubing 104-105, a connector 106 for tubing 105, and a ferrule 112. Tubing nut fastener 102 and ferrule 112 in this embodiment are used to provide a connection from tubing 104 to connector 106, such as connecting hydraulic lines on an aircraft to hydraulic actuators. For example, tubing 104 may carry hydraulic fluid through a wing of an aircraft, and tubing nut fastener 102 and ferrule 112 may be used to terminate tubing 104 at a hydraulic actuator for a flight control surface (e.g., an aileron) that is supplied hydraulic fluid from connector 106 and tubing 105.

In this embodiment, tubing nut fastener 102 includes a main body 108 and a nut 110, each of which are represented as having a particular size and configuration in FIGS. 1-4. However, tubing nut fastener 102 may have other configurations in other embodiments. Generally, tubing nut fastener 102 attaches to connector 106 of tubing 105, while ferrule 112 couples tubing 104 to tubing nut fastener 102. During an assembly process to couple tubing 104 to connector 106, ferrule 112 is slid inside and captured by tubing nut fastener 102. Ferrule 112 and tubing nut fastener 102 are then slid over an outer surface 136 of tubing 104 at an end of tubing 104, and main body 108 of tubing nut fastener 102 is threaded onto exterior threads 128 of connector 106. Tubing nut fastener 102 is then tightened by rotating nut 110 in a direction 124 using a wrench or other type of gripping tool until a desired torque is reached.

As nut 110 is tightened, nut 110 applies a torque to main body 108, which rotates main body 108 and engages interior threads of main body 108 (not shown) with exterior threads 128 of connector 106. When the torque applied by nut 110 reaches a threshold value that is based on the rotational friction between the interior threads of main body 108 and exterior threads 128 of connector 106, nut 110 rotates through a pre-determined arc with respect to main body 108 until tubing nut fastener 102 is torqued.

In the embodiments described herein, tubing nut fastener 102 includes a reference mark 116 on an outer surface 118 of main body 108 that visually indicates whether tubing nut fastener 102 is in a torqued state or an un-torqued state. This allows a user, or automated equipment, to visually determine whether tubing nut fastener 102 is in a torqued state, without manually checking tubing nut fastener 102 using a tool. Reference mark 116 is a relational representation of the relative rotation of nut 110 with respect to main body 108 and a visual indicator on nut 110, such as edges 120 of nut 110. In this embodiment, an outer surface 122 of nut 110 has a shape of a hexagon, although nut 110 may have other shapes in other embodiments. Further, rather than correlating reference mark 116 with edges 120 of nut 110, visual indicators may be fabricated or etched into outer surface 122 of nut 110 to provide a visual indication of the relative rotation between nut 110 and main body 108.

Figure 2:
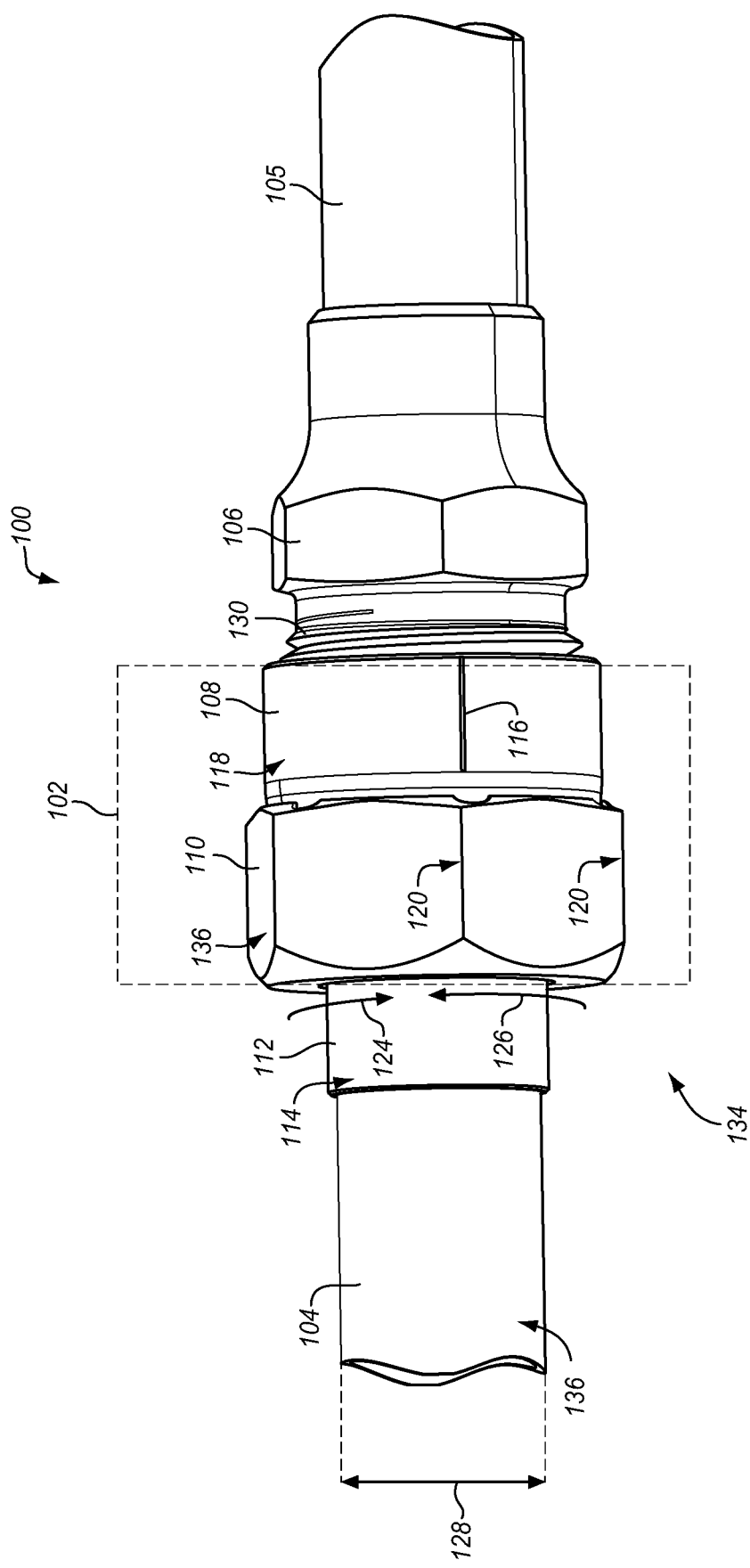
Figure 3:
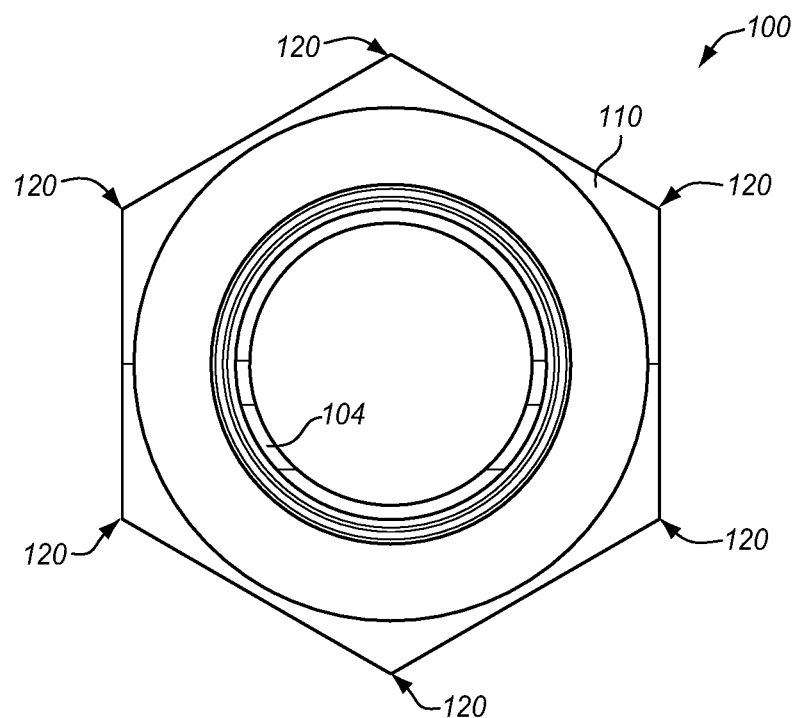
Figure 4:
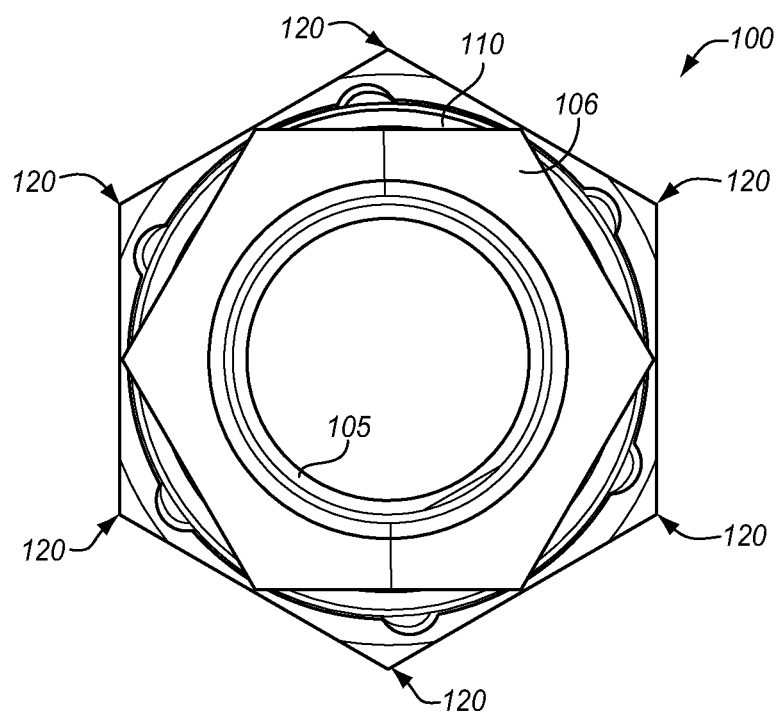

In FIG. 1, reference mark 116 on main body 108 is located between edges 120 of nut 110, which indicates in this embodiment that tubing nut fastener 102 is in a torqued state. In FIG. 2, reference mark 116 is located proximate to an edge 120 of nut 110, which indicates in this embodiment that tubing nut fastener 102 is in an un-torqued state. The un-torqued state depicted in FIG. 2 for tubing nut fastener 102 may be referred to as a second spatial relationship 134, while the torqued state depicted in FIG. 1 for tubing nut fastener 102 may be referred to a first spatial relationship 132. However, how reference mark 116 on main body 108 aligns with edges 120 of nut 110, or other visual indicators on or in outer surface 122 of nut 110, may be different in other embodiments. As reference mark 116 allows for a simple visual representation of the state of torque of tubing nut fastener 102, reference mark 116 provides a technical benefit of allowing a user, an automated system, etc., to visually determine whether tubing nut fastener 102 is in the torqued state or the un-torqued state in compression assembly 100. FIG. 3 is an isometric view of compression assembly 100 at end 138 (see FIG. 1), and FIG. 4 is an isometric view of compression assembly 100 at end 140 (see FIG. 1).

Figure 5:
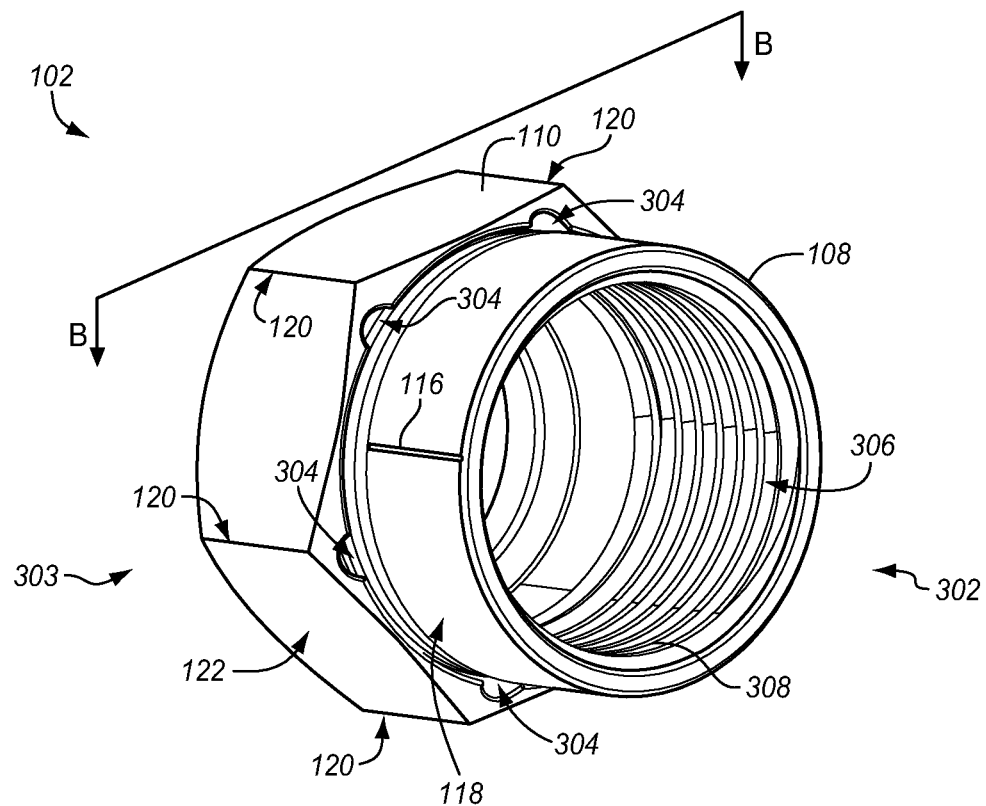
FIGS. 5-6 are isometric views of a tubing nut fastener in illustrative embodiments.
Figure 6:
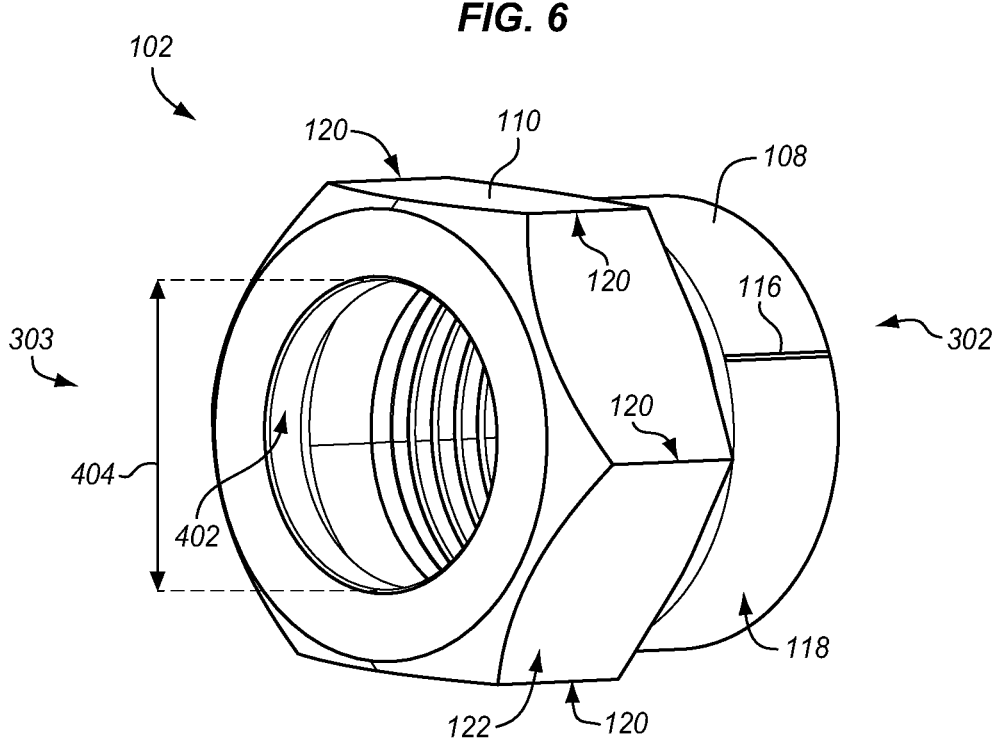

FIGS. 5-6 are isometric views of tubing nut fastener 102 in illustrative embodiments. FIGS. 5-6 illustrate that tubing nut fastener 102 includes, from an end 302 to an end 303, main body 108 and nut 110. In some embodiments, nut 110 includes ports 304, which will be discussed later. FIG. 5 further illustrates that main body 108 has an inner surface 306 that includes interior threads 308, which mate with exterior threads 128 of connector 106 (see FIG. 1). Referring to FIG. 6, nut 110 includes an inner ring 402, which is used to capture ferrule 112 within tubing nut fastener 102 as ferrule 112 is slid through end 302 of tubing nut fastener 102. Inner ring 402 has an inner diameter 404 that is less than an outer diameter of a portion of ferrule 112, which will be discussed later.

Figure 7:
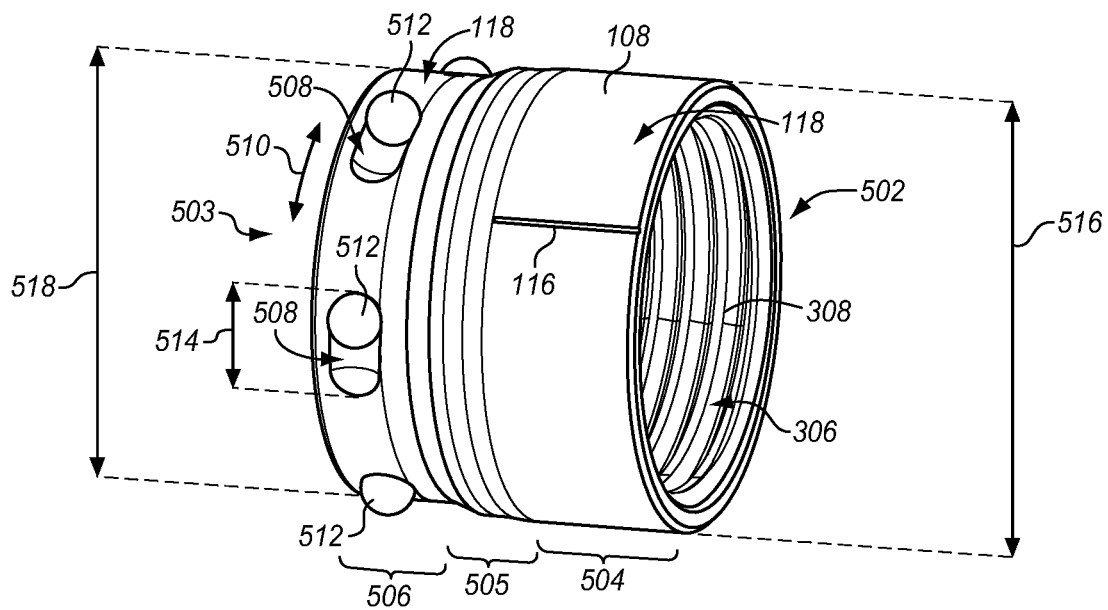
FIGS. 7-8 are isometric views of a main body of the tubing nut fastener of FIGS. 5-6 in illustrative embodiments.
Figure 8:
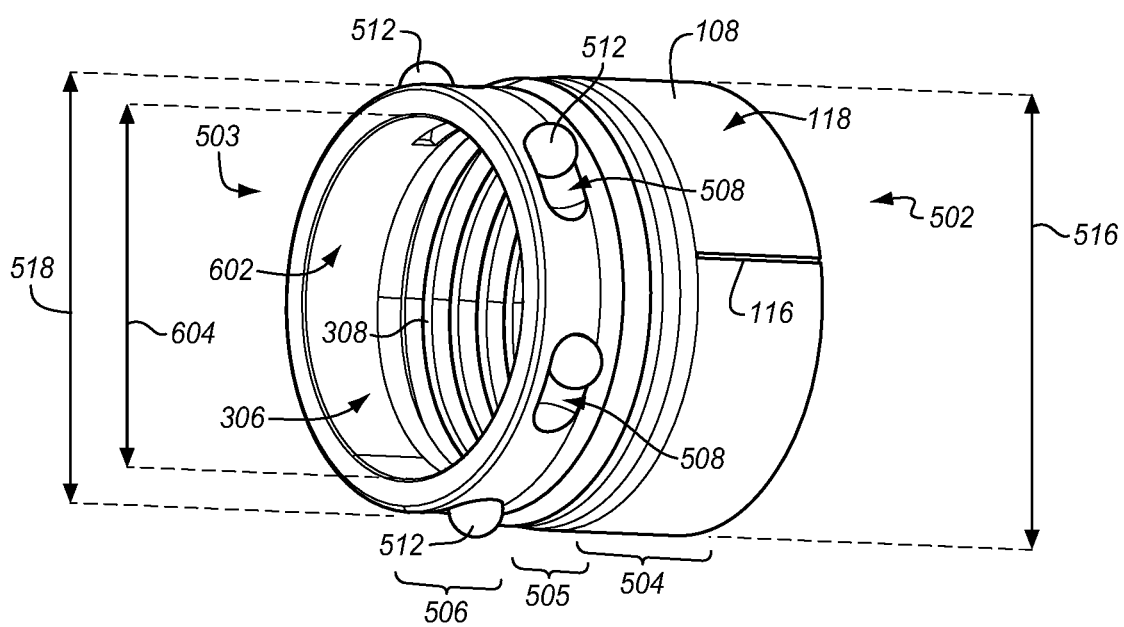

FIGS. 7-8 are isometric views of main body 108 in illustrative embodiments. FIGS. 7-8 illustrate that main body 108 is an elongated body that is generally cylindrical in shape between ends 502-503. Main body 108 is hollow in the axial direction. Outer surface 118 of main body 108 has different diameter portions along its length between ends 502-503. From end 502 to end 503, main body 108 includes a first cylindrical portion 504, a second cylindrical portion 505, and a third cylindrical portion 506. First cylindrical portion 504 has an outer diameter 516 and third cylindrical portion 506 has an outer diameter 518. Second cylindrical portion 505 has a diameter that varies between outer diameter 516 and outer diameter 518. Outer diameter 518 of third cylindrical portion 506 is sized to fit within an inner diameter of an inner surface of nut 110, which will be discussed later. FIG. 7 further illustrates that outer surface 118 of third cylindrical portion 506 includes channels 508 that are disposed on outer surface 118 in a circumferential direction 510. Channels 508 are sized to engage with engagement members 512, and channels 508 have a length 514 in circumferential direction 510. As evident in FIG. 7, channels 508 are not continuous around outer surface 118 in circumferential direction 510, with length 514 being finite, resulting in channels 508 being discrete. FIG. 8 illustrates that third cylindrical portion 506 includes an inner face 602 along inner surface 306, having an inner diameter 604 which is larger than an outer diameter of ferrule 112, which will be illustrated later.

Figure 9:
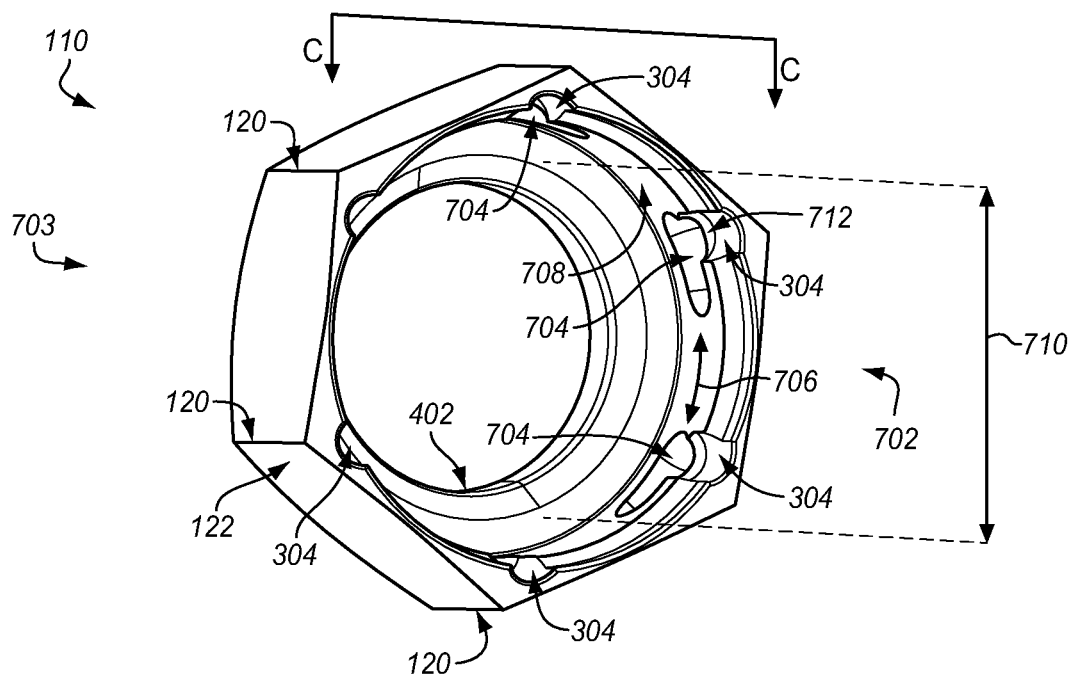
FIGS. 9-10 are isometric views of a nut of the tubing nut fastener of FIGS. 5-6 in illustrative embodiments.
Figure 10:
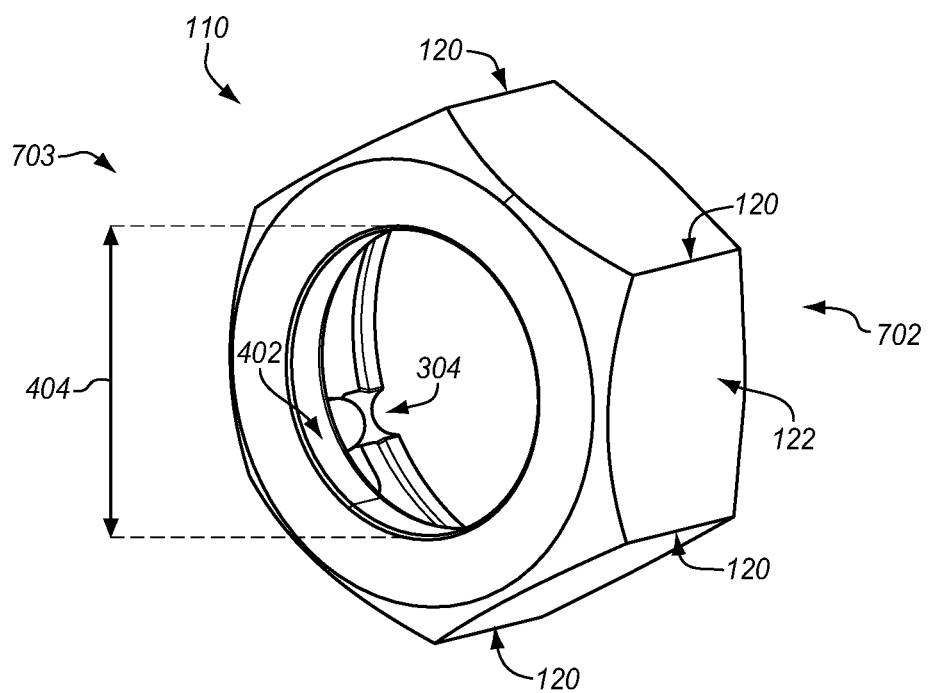

FIGS. 9-10 are isometric views of nut 110 in illustrative embodiments. FIGS. 9-10 illustrate that nut 110 is generally a hexagon shape between ends 702-703, and is hollow in an axial direction, although nut 110 may have other shapes in other embodiments. In this embodiment, nut 110 includes channels 704 disposed in a circumferential direction 706 along an inner surface 708 of nut 110. Channels 704 of nut 110 engage with engagement members 512 and channels 508 of main body 108 (see FIGS. 7-8) when main body 108 and nut 110 are fitted together as depicted in FIGS. 5-6. When nut 110 includes ports 304, ports 304 may be located along inner surface 708 of nut 110, extending from channels 704 to end 702. Ports 304 may be used to load engagement members 512 into channels 508 of main body 108 and channels 704 of nut 110 when assembling tubing nut fastener 102, as depicted in FIGS. 5-6. Ports 304 in this embodiment include a ridge 712 that forms a restriction for engagement members 512 to pass by when loading engagement members 512 into channels 704 in nut 110 and channels 508 in main body 108. For example, when engagement members 512 comprise balls, ports 304 may be sized to receive the balls. The balls may be placed in channels 508 of main body 108 and ports 304 of nut 110, and both main body 108 and nut 110 may be slid together until the balls rest against ridges 712. A press may then be used to snap main body 108 and nut 110 together, with ridges 712 holding main body 108, nut 110, and engagement members 512 together as an assembly.

FIG. 9 further illustrates that inner surface 708 is generally cylindrical, with an inner diameter 710 that is sized to be larger than outer diameter 518 of main body 108 to enable third cylindrical portion 506 of main body 108 to fit within inner diameter 710 of nut 110. FIG. 10 illustrates inner ring 402 of nut 110, previously described in FIG. 6, which projects radially inward from inner surface 708 of nut 110. Inner ring 402 has an inner diameter 404 that sized to interface with portions of ferrule 112, which will be discussed later. Further, inner diameter 404 is less than inner diameter 710 of FIG. 9.

Figure 11:
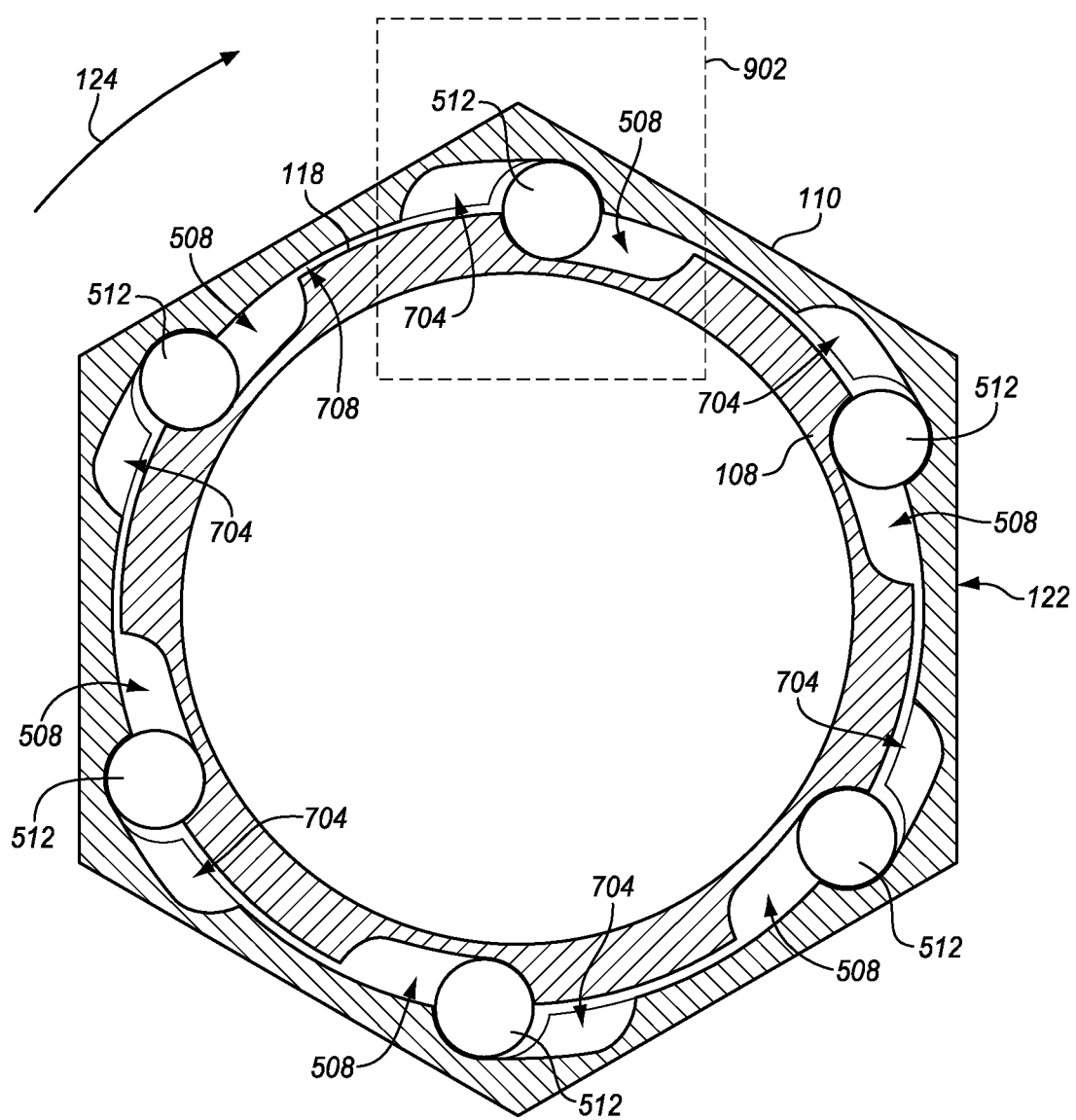
FIGS. 11-13 are cross-sections of the tubing nut fastener of FIGS. 5-6 in illustrative embodiments.
Figure 12:
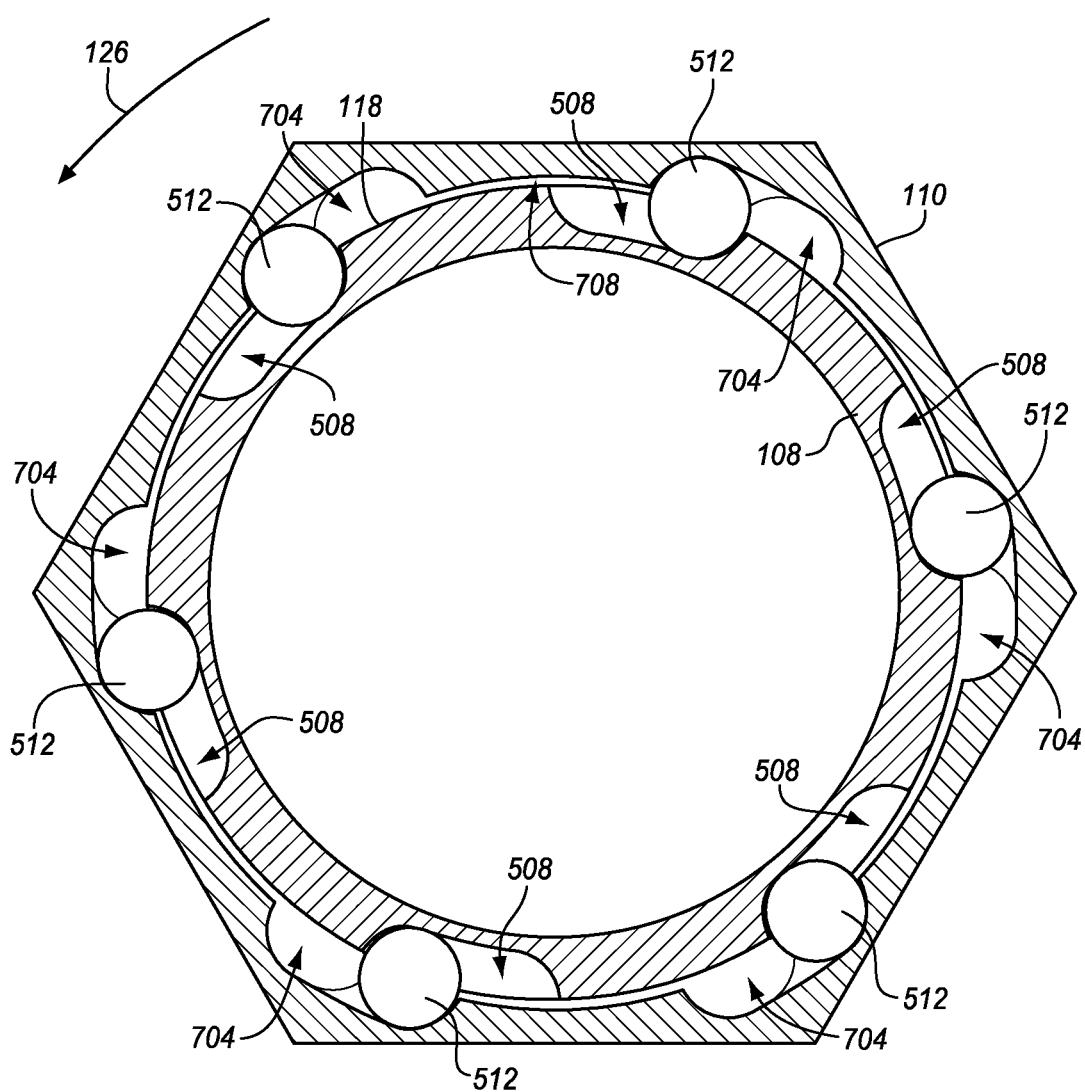
Figure 13:
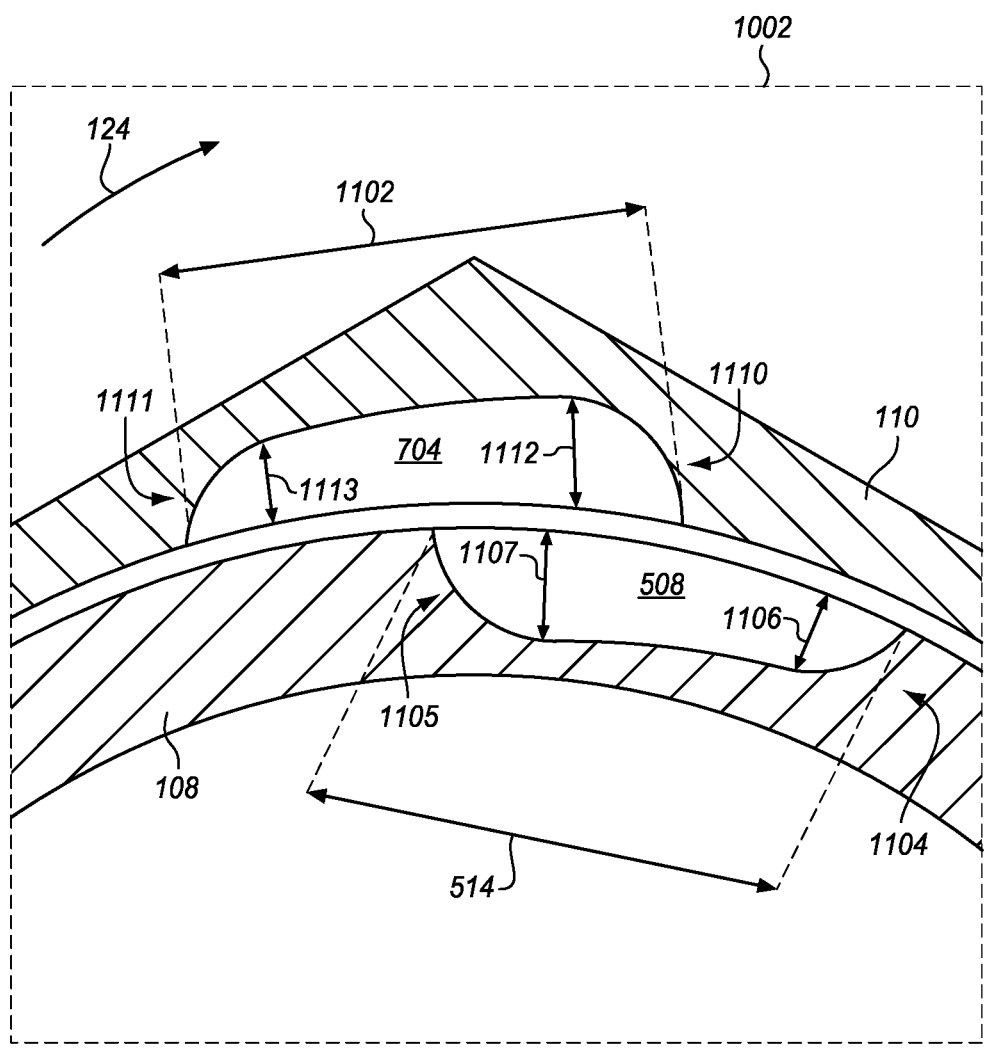

FIGS. 11-12 are cross-sectional views of tubing nut fastener 102 along cut lines B-B of FIG. 5 in illustrative embodiments, and FIG. 13 is an expanded view of region 902 of FIG. 11 with engagement members 512 removed in an illustrative embodiment. In FIGS. 11-12, the relationship between channels 704 in nut 110, channels 508 in main body 108, and engagement members 512 are more clearly discernable. With main body 108 and nut 110 mated together, and engagement members 512 installed, FIG. 11 represents a configuration of tubing nut fastener 102 in an un-torqued state (see FIG. 2), and FIG. 12 represents a configuration of tubing nut fastener 102 in a torqued state (see FIG. 1). In some embodiments, channels 704 in nut 110 and/or channels 508 in main body 108 may vary in depth along their length, as depicted in FIG. 13. FIG. 13 illustrates that channel 508 in main body 108 has a length 514 between ends 1104-1105 of channel 508. In this embodiment, a depth 1106 at end 1104 of channel 508 is less than a depth 1107 at end 1105 of channel 508. FIG. 13 further illustrates that channel 704 in nut 110 has a length 1102 between ends 1110-1111 of channel 704. In this embodiment, a depth 1112 at end 1110 of channel 704 is greater than a depth 1113 at end 1111 of channel 704.

As nut 110 rotates in direction 124 and main body 108 remains stationary, engagement members 512 ride along channels 508 in main body 108 and channels 704 in nut 110, which have relatively decreasing depths in direction 124 of rotation (see FIG. 13). The decreasing depths of channels 508 in main body 108 and channels 704 in nut 110 encountered by engagement members 512 generates a radial load that forces nut 110 and main body 108 apart until tubing nut fastener 102 is in the torqued state illustrated in FIG. 12, generating a torsional spring force in tubing nut fastener 102 in direction 126. Further, as nut 110 rotates in direction 124 and main body 108 remains stationary, edge 120 of nut 110 and reference mark 116 are misaligned as depicted in FIG. 1, indicating that tubing nut fastener 102 is in a torqued state. If tubing nut fastener 102 were to become loose, this torsional spring force causes nut 110 to rotate in direction 126 (see FIG. 12), which aligns reference mark 116 with edges 120 of nut 110 as depicted in FIG. 2, thereby providing a clear visual indication that tubing nut fastener 102 is in an un-torqued state. Because length 514 of channels 508 and length 1102 of channels 704 are finite, nut 110 and main body 108 are limited in their relative rotation with respect to each other that is based on length 514 of channels 508 and length 1002 of channels 704.

Figure 14:
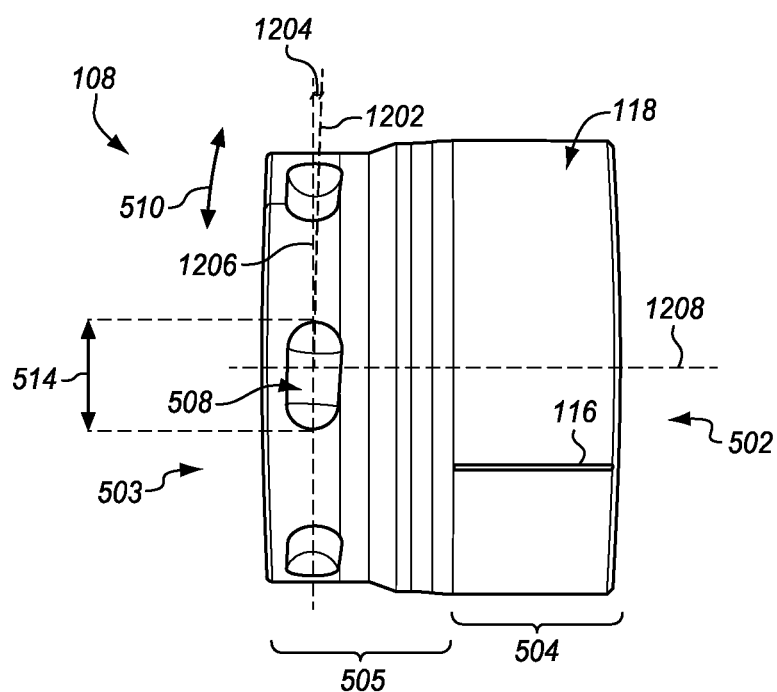
FIG. 14 is another isometric view of the main body of FIGS. 7-8 in an illustrative embodiment.

FIG. 14 is another isometric view of main body 108 in an illustrative embodiment. In some embodiments, channels 508 may have a centerline 1202 along their length that is formed at an angle 1204 offset from a plane 1206 that is orthogonal to axis 1208. A non-zero value of angle 1204 may be based on a thread pitch (not shown) of interior threads 308 of main body 108 to increase the torsional spring force generated between main body 108 and nut 110 when main body 108 and nut 110 are rotated with respect to each other. For example, angle 1204 may be the reverse of the thread pitch of interior threads 308 of main body 108, which allows engagement members 512 to travel along channels 508 and channels 704, moving inner ring 402 of nut 110 towards end 503 of main body 108. Centerline 1202 may be offset from plane 1206 either away from end 503, as illustrated in FIG. 12, or towards end 503. In other embodiments, angle 1204 may be about zero, with channels 508 arranged such that centerlines 1202 intersect plane 1206.

Figure 15:
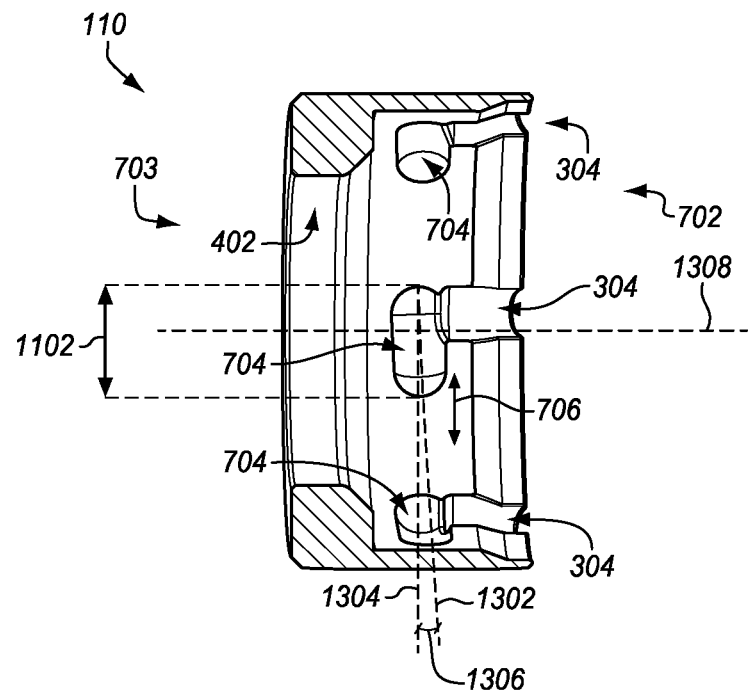
FIG. 15 is a cross-sectional view of the nut of FIGS. 9-10 in an illustrative embodiment.

FIG. 15 is another isometric view of nut 110 in an illustrative embodiment. Similar to previously described with respect to channels 508 of main body 108, channels 704 may have a centerline 1302 along their length that is formed at an angle 1306 from a plane 1304 orthogonal to axis 1308. A non-zero value of angle 1306 may be related to a thread pitch (not shown) of interior threads 308 of main body 108 to increase the torsional spring force generated between main body 108 and nut 110 when main body 108 and nut 110 are rotated with respect to each other. Angle 1306 may be the reverse of the thread pitch of interior threads 308 of main body 108, which allows engagement members 512 to travel along channels 508 and channels 704, moving inner ring 402 of nut 110 towards end 503 of main body 108. Centerline 1302 may be offset from plane 1304 either away from end 703, as illustrated in FIG. 15, or towards end 703. In other embodiments, angle 1306 may be about zero, with channels 704 arranged such that centerlines 1302 intersect plane 1304.

Figure 16:
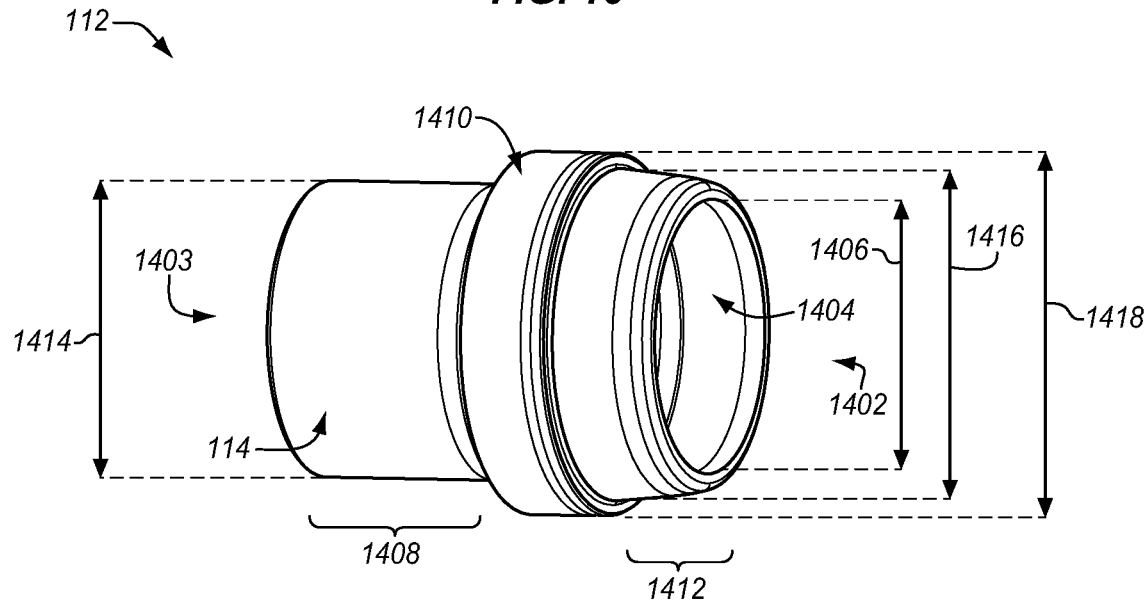
FIGS. 16-17 are isometric views of a ferrule in an illustrative embodiment.
Figure 17:
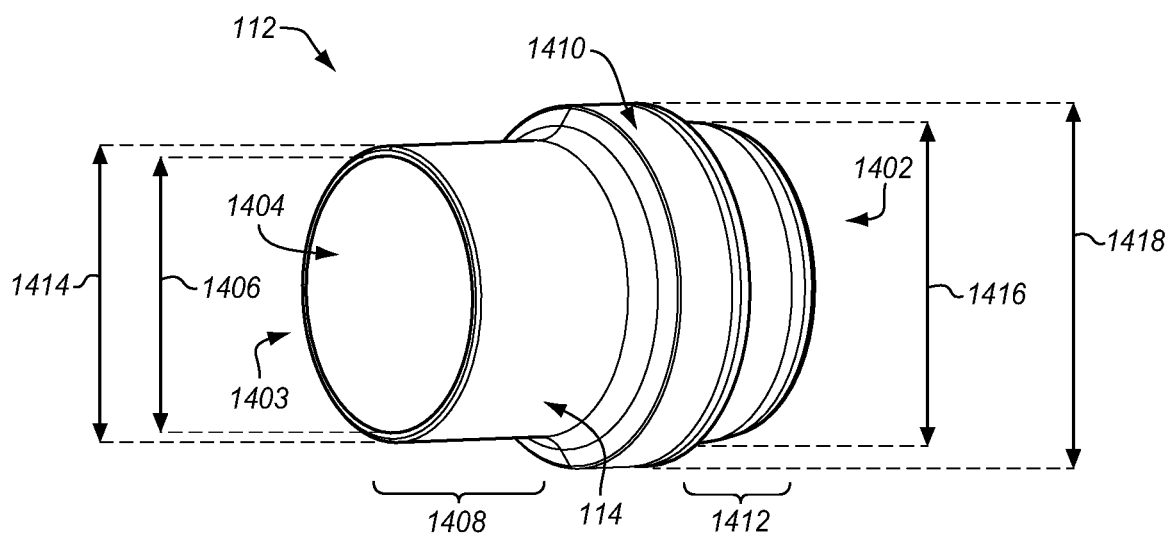

FIGS. 16-17 are isometric views of ferrule 112 in illustrative embodiments. FIGS. 16-17 illustrate that ferrule 112 is an elongated body generally cylindrical in shape between ends 1402-1403. Ferrule 112 has an interior 1404 that is hollow in the axial direction, and has an inner diameter 1406 sized to fit over tubing 104, such that inner diameter 1406 of ferrule 112 is less than outer diameter 130 of tubing 104 (see FIG. 1). Outer surface 114 of ferrule 112 has different diameter portions along its length. From end 1403 to end 1402, ferrule 112 includes a first cylindrical portion 1408, an outer ring 1410, and a second cylindrical portion 1412. First cylindrical portion 1408 is disposed between end 1403 and outer ring 1410, and has an outer diameter 1414. Second cylindrical portion 1412 is disposed between outer ring 1410 and end 1402, and has an outer diameter 1416 that decreases or tapers from outer ring 1410 to end 1402.

Outer ring 1412 has an outer diameter 1418 that is greater than outer diameter 1414 of first cylindrical portion 1408 and outer diameter 1416 of second cylindrical portion 1412. Outer ring 1410 engages with inner ring 402 of nut 110 when end 1403 of ferrule 112 is slid into end 302 of tubing nut fastener 102 (see FIG. 5), capturing ferrule 112 in tubing nut fastener 102.

Figure 18:
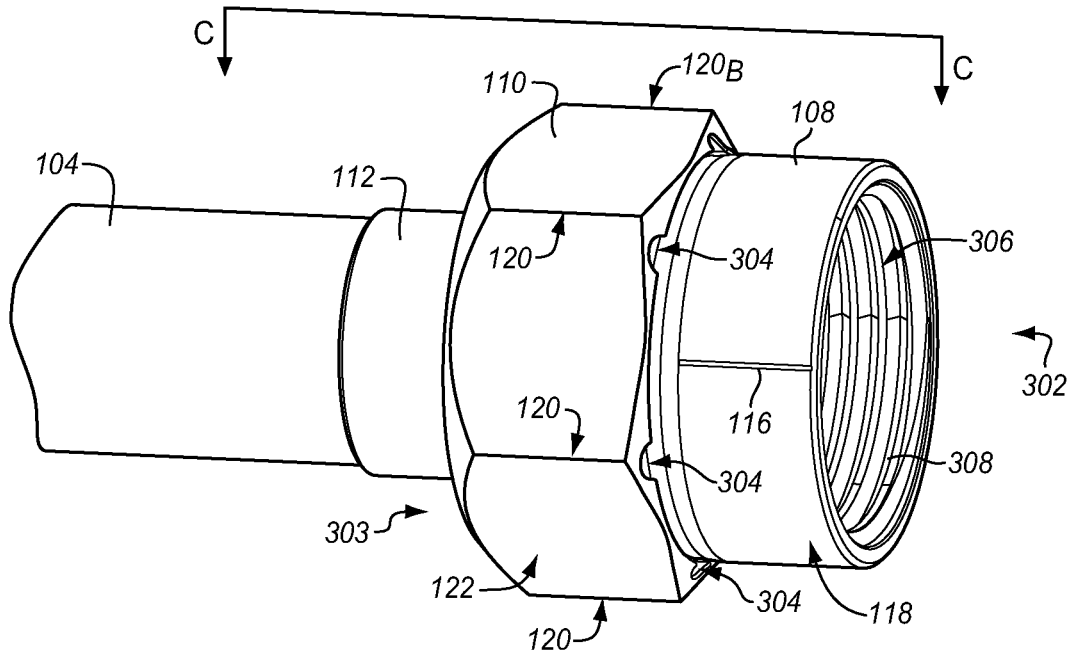
FIGS. 18-19 are isometric views of the tubing nut fastener of FIGS. 5-6 and the ferrule of FIGS. 16-17 mated together in illustrative embodiments.
Figure 19:
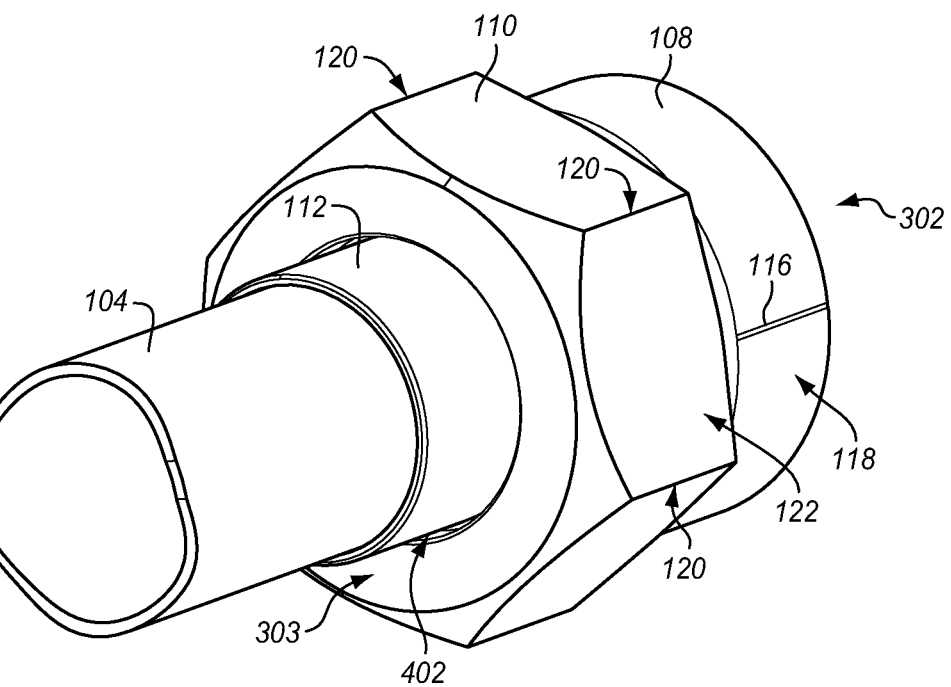

FIGS. 18-19 are isometric views of tubing nut fastener 102 and ferrule 112 mated together in illustrative embodiments. In FIGS. 18-19, ferrule 112 has been slid into tubing nut fastener 102, and the combination of tubing nut fastener 102 and ferrule 112 have been slid over an end of tubing 104 (not shown in this view).

Figure 20:
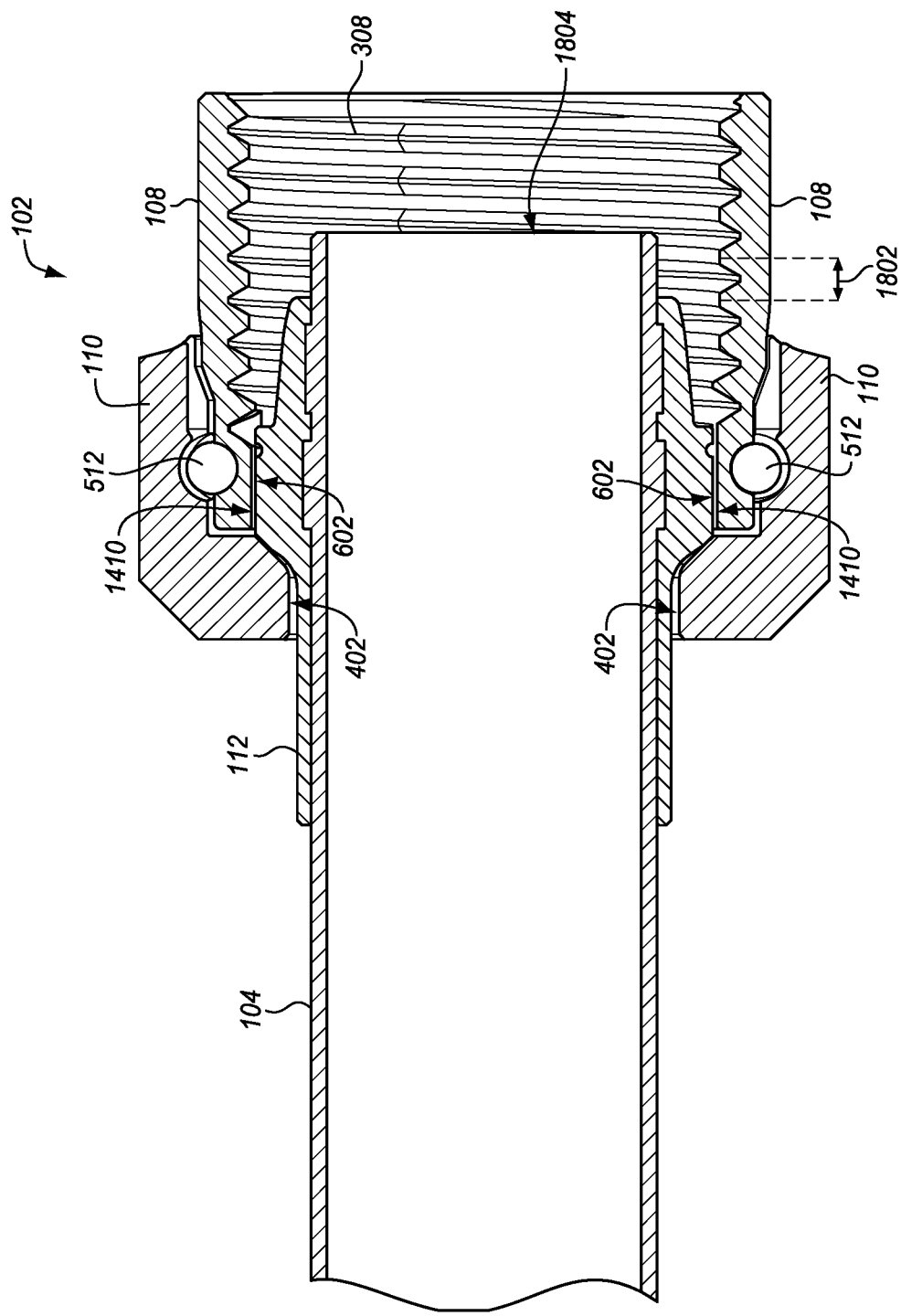
FIG. 20 is a cross-sectional view of the tubing nut fastener and ferrule of FIG. 18 in an illustrative embodiment.

FIG. 20 is a cross-sectional view of tubing nut fastener 102, ferrule 112, and tubing 104 in an illustrative embodiment. In FIG. 20, the cross-sectional view is along cut lines C-C of FIG. 18, which shows how outer ring 1410 of ferrule 112 is captured by inner ring 402 of nut 110. FIG. 20 also illustrates that interior threads 308 of main body 108 have a thread pitch 1802, and that ferrule 112 engages with tubing 104 proximate to an end 1804 of tubing 104.

Figure 21:
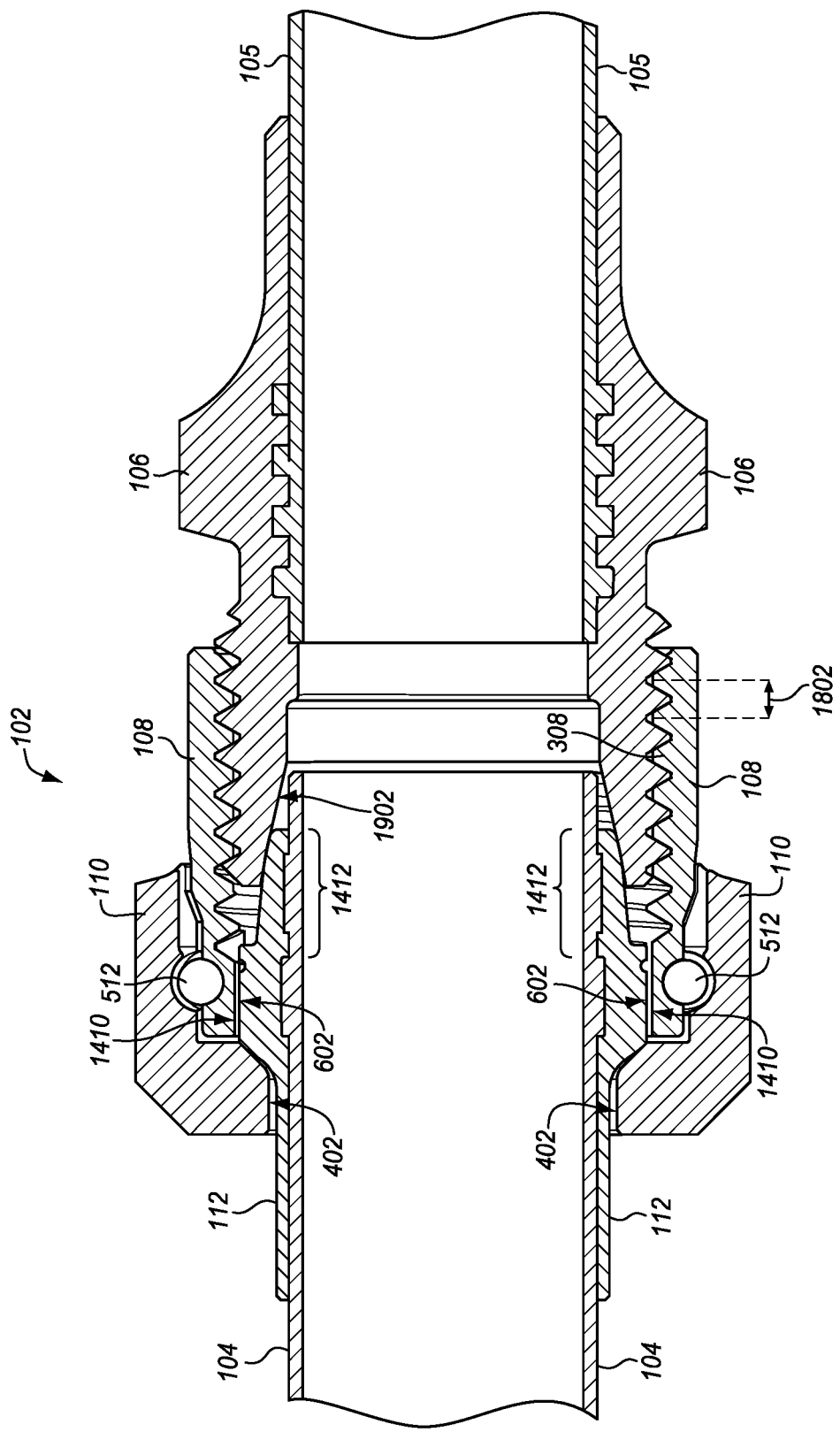
FIG. 21 is a cross-sectional view of the compression fastener of FIG. 1 in an illustrative embodiment.

FIG. 21 is a cross-sectional view of compression assembly 100 in an illustrative embodiment. In FIG. 21, the cross-sectional view is along cut lines A-A of FIG. 1, which shows how second cylindrical portion 1412 of ferrule 112 engages with an inner ramp face 1902 of connector 106 when tubing nut fastener 102 is in the torqued state (see FIG. 1).

Figure 22:
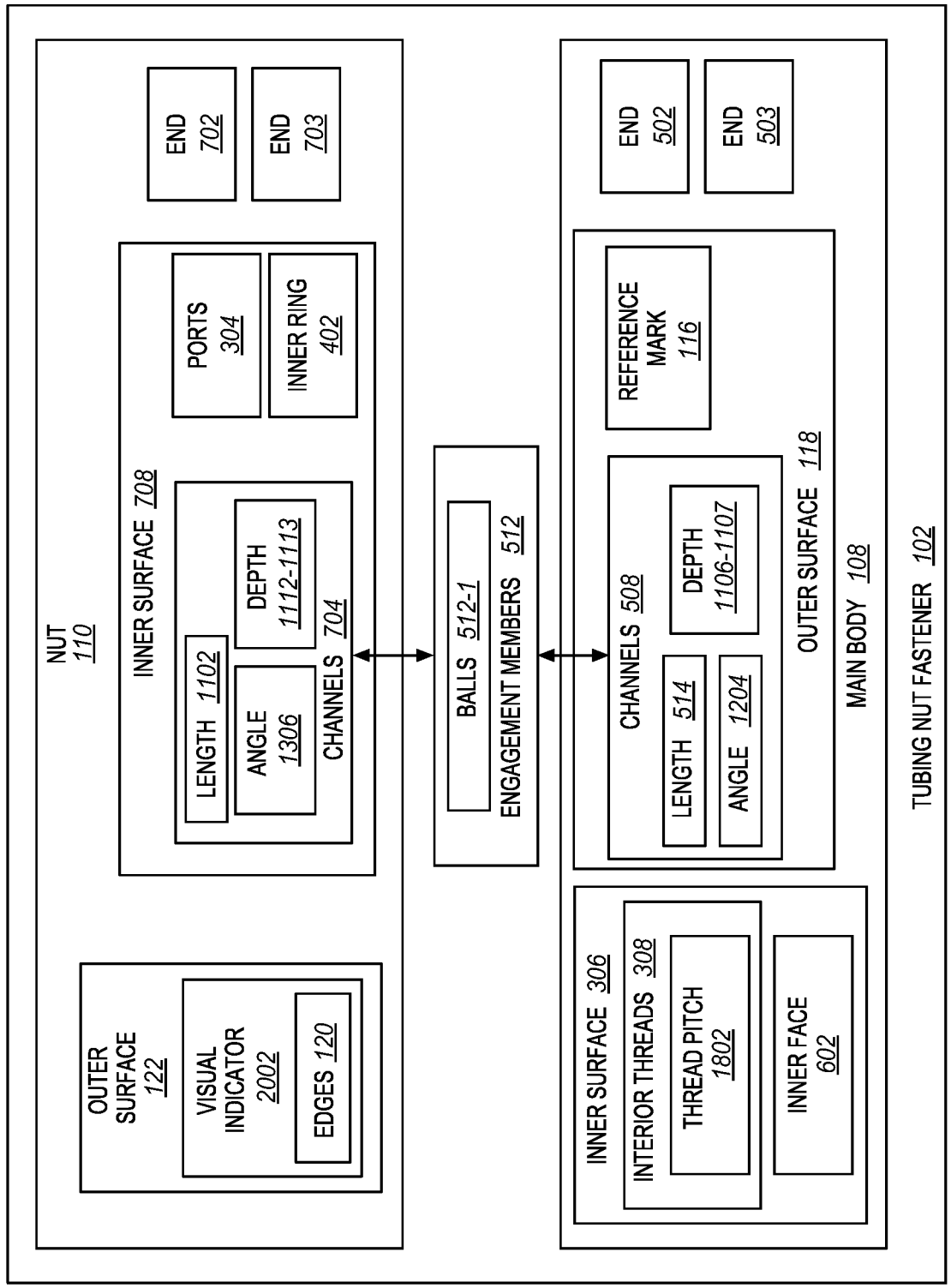
FIG. 22 is a block diagram of the tubing nut fastener of FIGS. 5-6 in an illustrative embodiment.

FIG. 22 is a block diagram of tubing nut fastener 102 in an illustrative embodiment. Tubing nut fastener 102 may be referred to as a compression nut in some embodiments. Tubing nut fastener 102 in this embodiment includes nut 110, which may be referred to as a first member in some embodiments, and a main body 108, which may be referred to as a second member in some embodiments. Nut 110 may have various shapes and sizes not previously described. In one embodiment, nut 110 may include edges 120, which can vary in number and position on outer surface 122 of nut 110. Edges 120 in this embodiment comprise one type of visual indicator 2002 on outer surface 122 of nut 110, but other types of visual indicators 2002 may be used. For example, any number of features may be etched or permanently marked in outer surface 122 of nut 110, which is used in different spatial relationships with reference mark 116 on main body 108 to indicate whether tubing nut fastener 102 is in a torqued state or an un-torqued state.

In one embodiment, nut 110 includes inner surface(s) 708, which include the various features previously described, such as channels 704, ports 304, and inner ring 402. Inner surface(s) 708 may be patterned or shaped as desired such that nut 110 and main body 108 functionally interact as previously described, without being limited to only the patterns and shapes illustrated in FIGS. 1-21. Main body 108 includes inner surface(s) 306 and outer surface(s) 118, which include the various features previously described, such as reference mark 116, channels 508, and inner face 602. Inner surface(s) 306 may be patterned or shaped as desired such that nut 110 and main body 108 functionally interact as previously described, without being limited to only the patterns and shapes illustrated in FIGS. 1-21. As discussed previously, engagement members 512 ride within channels 704 in nut 110 and channels 508 in main body 108, and may comprise any type of rotatable members as desired. In one embodiment, engagement members 512 comprise balls 512-1, although other embodiments may include non-spherical shapes, cylindrical rollers, etc.

Figure 23:
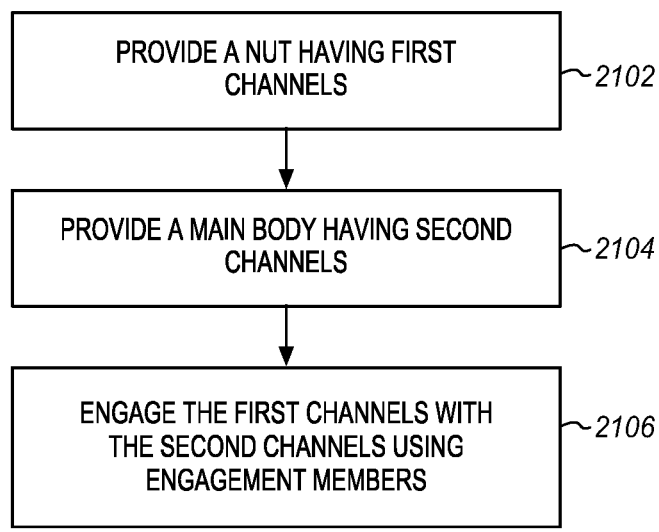
FIG. 23 is a flow chart of a method of fabricating a tubing nut fastener in an illustrative embodiment.
Figure 24:
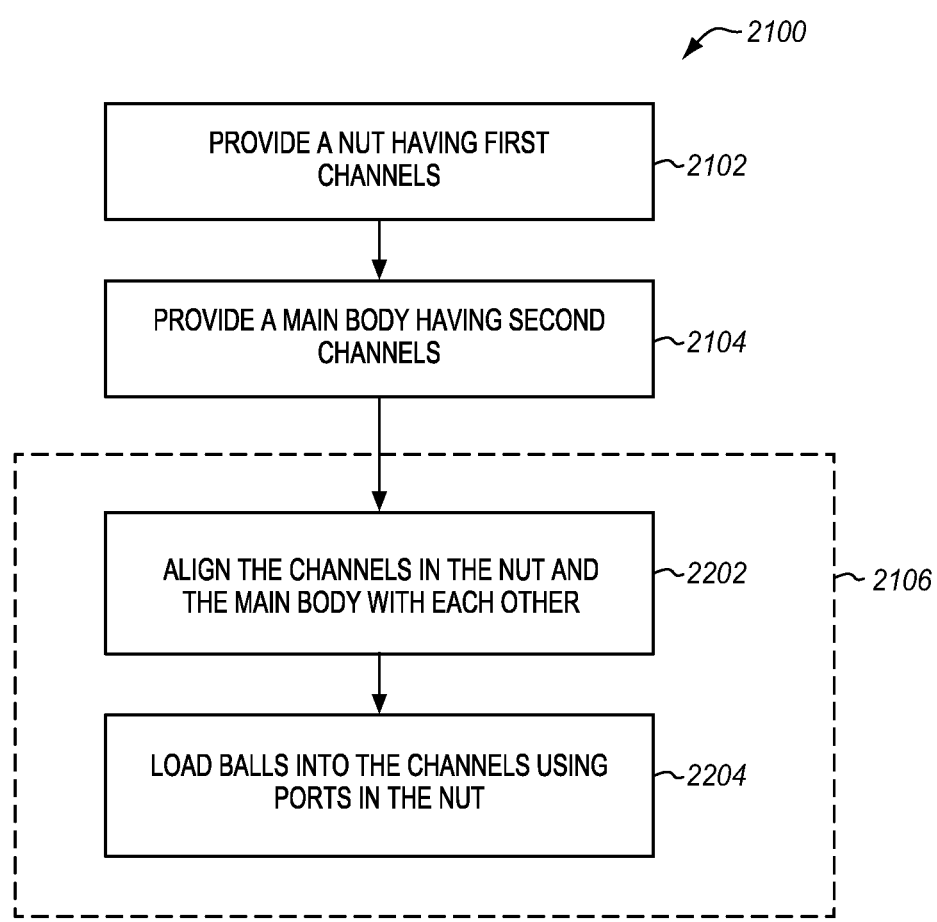
FIG. 24 is a flow chart depicting additional details of the method of FIG. 23 in an illustrative embodiment.

FIG. 23 is a flow chart of a method 2100 of fabricating a tubing nut fastener in an illustrative embodiment, and FIG. 24 is a flow chart depicting additional details of method 2100 in an illustrative embodiment. Method 2100 will be described with respect to tubing nut fastener 102 of FIGS. 1-22, although method 2100 may be performed for other types of compression fittings, not shown. The methods described herein may include other steps, not shown. Further, the methods described herein may be performed in an alternate order.

Step 2102 comprises providing a nut 110 (see FIGS. 9-10) having the various features previously described. Step 2104 comprises providing main body 108 (see FIGS. 7-8) having the various features previously described. Step 2106 comprises engaging channels 704 in nut 110 with channels 508 in main body 108 with engagement members 512 (see FIGS. 5-6). This process may include inserting end 503 of main body 108 into end 702 of nut 110, such that third cylindrical portion 506 of main body 108 is surrounded by inner surface 708 of nut 110. This process may further include aligning channels 508 in main body 108 with channels 704 in nut 110 (e.g., by rotating main body 108 in circumferential direction 510 with respect to nut 110 (see step 2202 of FIG. 24, and FIG. 7)), and loading engagement members 512 (e.g., balls) into ports 304 of nut 110 (see step 2204 of FIG. 24, and FIG. 5) in order to position engagement members 512 in channels 704 of nut 110 and channels 508 of main body 108.

Figure 25:
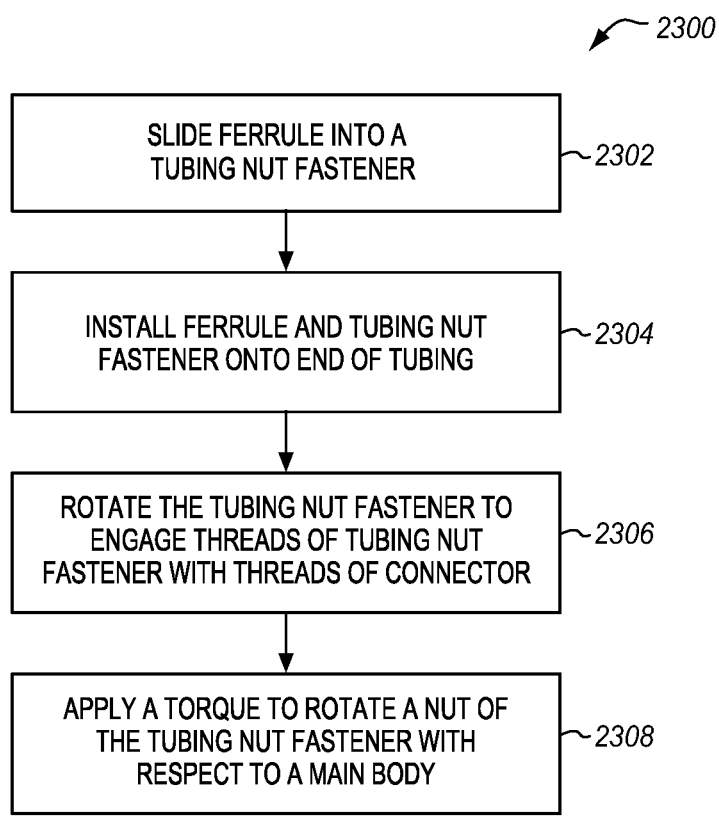
FIG. 25 is a flow chart of a method of terminating tubing at a connector in an illustrative embodiment.
Figure 26:
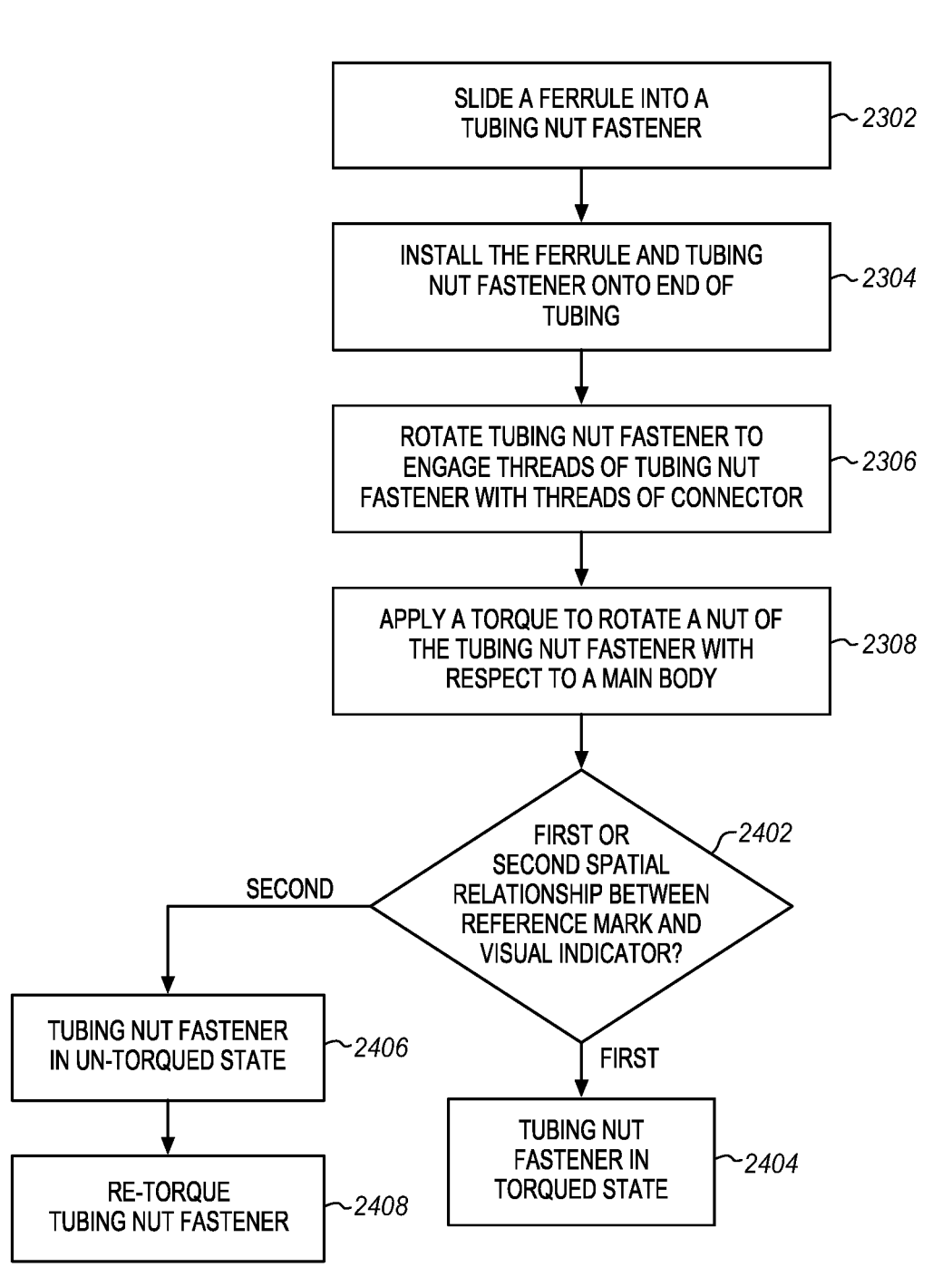
FIG. 26 is a flow chart depicting additional details of the method of FIG. 25 in an illustrative embodiment.

FIG. 25 is a flow chart of a method 2300 of terminating tubing at a connector in an illustrative embodiment, and FIG. 26 is a flow chart depicting additional details of method 2300 in an illustrative embodiment. Method 2300 will be described with respect to tubing nut fastener 102 of FIGS. 1-22, although method 2300 may be performed by other types of compression fittings, not shown. Step 2302 comprises sliding ferrule 112 into tubing nut fastener 102 (see FIG. 18), which entails sliding end 1403 of ferrule 112 into end 302 of tubing nut fastener 102 until outer ring 1410 of ferrule 112 contacts inner ring 402 of nut 110 (see FIG. 20). Step 2304 comprises installing the combination of ferrule 112 and tubing nut fastener 102 onto end 1804 of tubing 104 (see FIG. 20). Step 2306 comprises rotating tubing nut fastener 102 to engage interior threads 308 of main body 108 onto exterior threads 128 of connector 106 (see FIG. 2, which depicts the un-torqued state of tubing nut fastener 102). Step 2308 comprises applying a torque to rotate nut 110 relative to main body 108 to engage engagement members 512 with channels 508 in main body and channels 704 in nut 110 (see FIGS. 12 and 21).

At some point in the future, a user or automated equipment may visually inspect compression assembly 100 to determine if tubing nut fastener 102 is in a torqued state or an un-torqued state, which is determined based on the spatial relationship between reference mark 116 and visual indicator 2002 (e.g., edge 120) of nut 110 (see step 2402 of FIG. 24).

With tubing nut fastener 102 in the torqued state depicted in FIG. 1, a spatial relationship exists between visual indicator 2002 of nut 110 (e.g., edge 120 of nut 110) and reference mark 116 on main body 108, which is that reference mark 116 is mis-aligned with edges 120 of nut 110. This spatial relationship (e.g., first spatial relationship 132) indicates that tubing nut fastener 102 is, or remains in, the torqued state (see step 2404).

However, tubing nut fastener 102 is in an un-torqued state depicted in FIG. 2, a spatial relationship exists between visual indicator 2002 on nut 110 (e.g., edge 120 of nut 110) and reference mark 116 on main body 108, which is that reference mark 116 is aligned with edges 120 of nut 110. This spatial relationship (e.g., second spatial relationship 134) indicates that tubing nut fastener 102 is in an un-torqued state (see step 2406). With tubing nut fastener 102 determined to be in an un-torqued state, an action may be performed to re-torque tubing nut fastener 102 (see step 2408), which returns tubing nut fastener 102 to the torqued state as depicted in FIG. 1.

Tubing nut fastener 102 provides a leak-free fluid seal between tubing 104 and connector 106, with the ability to visually determine whether tubing nut fastener 102 is in a torqued state or un-torqued state using reference mark 116 on main body 108 and visual indicator(s) 2002 on nut 110, such as edges 120 of nut 110. Tubing nut fastener 102 therefore provides a technical benefit over the prior art compression fittings, allowing a user to immediately determine, without further mechanical re-tightening of tubing nut fastener 102, whether tubing nut is in a torqued state or an un-torqued state.

Figure 27:
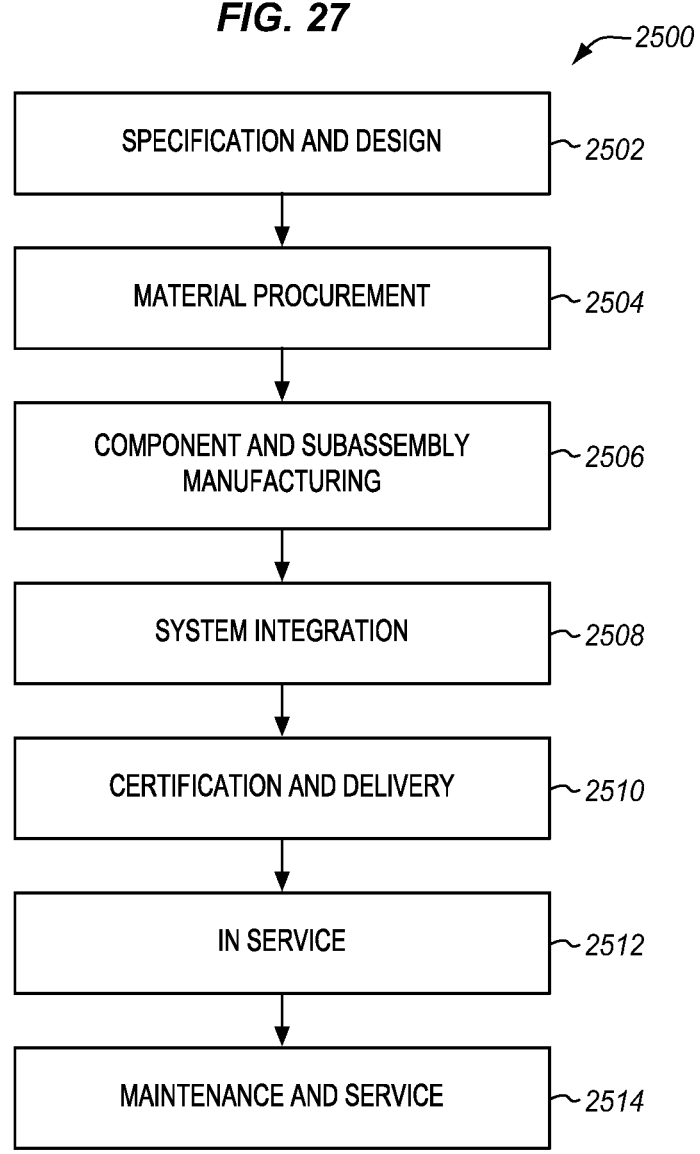
FIG. 27 is a flow chart illustrating an aircraft manufacturing and service method in an illustrative embodiment.
Figure 28:
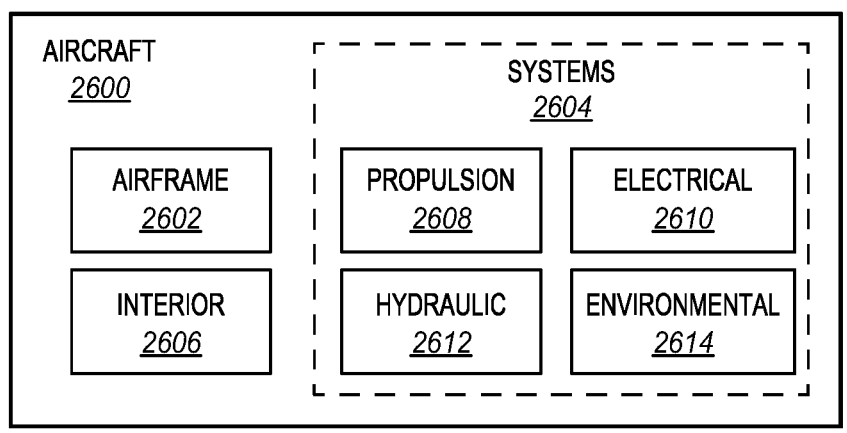
FIG. 28 is a schematic diagram of an aircraft in an illustrative embodiment.

The embodiments of the disclosure may be described in the context of an aircraft manufacturing and service method 2500 as shown in FIG. 27 and aircraft 2600 as shown in FIG. 28. During pre-production, exemplary method 2500 may include a specification and design 2502 of aircraft 2600, and material procurement 2504. During production, component and subassembly manufacturing 2506 and system integration 2508 of aircraft 2600 takes place. Thereafter, aircraft 2600 may go through certification and delivery 2510 in order to be placed in service 2512. While in service by a customer, aircraft 2600 is scheduled for routine maintenance and service 2514 (which may also include modification, reconfiguration, refurbishment, and so on).

Each of the processes of method 2500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 28, aircraft 2600 produced by exemplary method 2500 may include an airframe 2602 with a plurality of systems 2604 and an interior 2606. Examples of systems 2604 include one or more of propulsion systems 2608, an electrical system 2610, a hydraulic system 2612, and an environmental system 2614. Any number of other systems may be included. Although an aerospace example is shown, the principles described in this specification may be applied to other industries, such as the automotive industry.

Apparatus and methods embodied herein may be employed during any one or more of the stages of the production and service method 2500. For example, components or subassemblies corresponding to process 2506 may be fabricated or manufactured in a manner similar to components or subassemblies produced while aircraft 2600 is in service. Also, one or more apparatus embodiments, method embodiments, or a combination thereof may be utilized during the component subassembly and manufacturing 2506 and system integration 2508, for example, by substantially expediting assembly of or reducing the cost of aircraft 2600. Similarly, one or more of apparatus embodiments, method embodiments, or a combination thereof may be utilized while aircraft 2600 is in service, for example and without limitation, to maintenance and service 2514.

Although specific embodiments were described herein, the scope is not limited to those specific embodiments. Rather, the scope is defined by the following claims and any equivalents thereof

What is claimed is:
1. A tubing nut fastener comprising:
a nut having:
first channels disposed circumferentially and spaced radially along an inner surface proximate to a first end; and
an inner ring radially projecting from the inner surface and proximate to a second end;
a main body having a third end and a fourth end, and including:
a reference mark disposed on an outer surface; and
second channels disposed circumferentially and spaced radially along the outer surface proximate to the fourth end, wherein the inner surface of the nut surrounds the outer surface of the main body at the fourth end; and
engagement members disposed within the first channels and the second channels between the nut and the main body;
wherein at least one of the first channels and the second channels vary in depth along a length.

2. The tubing nut fastener of claim 1, wherein:
the first channels vary in depth along the length.

3. The tubing nut fastener of claim 1, wherein:
the second channels vary in depth along the length.

4. The tubing nut fastener of claim 1, wherein:
the main body includes an inner surface having interior threads proximate to the third end, and
the first channels have centerlines with non-zero angles that are based on a thread pitch of the interior threads.

5. The tubing nut fastener of claim 1, wherein:
the main body includes an inner surface having interior threads proximate to the third end, and
the second channels have centerlines with non-zero angles that are based on a thread pitch of the interior threads.

6. The tubing nut fastener of claim 1, wherein:
the engagement members comprise balls, and
the nut includes ports in the inner surface that extend from the first channels to the first end, and are sized to receive the balls.

7. The tubing nut fastener of claim 1, wherein:
a spatial relationship between the reference mark and a visual indicator on the nut indicates whether the tubing nut fastener is in a torqued state or an un-torqued state.

8. A method of fabricating a tubing nut fastener, the method comprising:
providing a nut having first channels disposed circumferentially and spaced radially along an inner surface proximate to a first end, and an inner ring radially projecting from the inner surface proximate to a second end;
providing a main body having a third end and a fourth end, and including a reference mark disposed on an outer surface, and second channels disposed circumferentially and spaced radially along the outer surface proximate to the fourth end; and
engaging the first channels with the second channels using engagement members, wherein at least one of the first channels and the second channels vary in depth along a length.

9. The method of claim 8, wherein:
the first channels vary in depth along the length.

10. The method of claim 8, wherein:
the second channels vary in depth along the length.

11. The method of claim 8, wherein:
the main body includes an inner surface having interior threads proximate to the third end, and
the first channels have centerlines with non-zero angles that are based on a thread pitch of the interior threads.

12. The method of claim 8, wherein
the main body includes an inner surface having interior threads proximate to the third end, and
the second channels have centerlines with non-zero angles that are based on a thread pitch of the interior threads.

13. The method of claim 8, wherein:
the engagement members comprise balls,
the nut includes ports in the inner surface that extend from the first channels to the first end and are sized to receive the balls, and
engaging the first channels with the second channels comprises:
aligning the first channels with the second channels; and
loading the balls into the first channels and the second channels using the ports.

14. A method of terminating tubing at a connector using a tubing nut fastener, the method comprising:
sliding a ferrule into the tubing nut fastener, wherein the tubing nut fastener includes a nut having first channels disposed circumferentially along an inner surface, a main body having second channels disposed circumferentially along an outer surface, and engagement members disposed within the first channels and the second channels between the nut and the main body;
installing the ferrule and tubing nut fastener onto an end of the tubing;
rotating the tubing nut fastener to engage interior threads of the main body with exterior threads of the connector; and
applying a torque to rotate the nut with respect to the main body to reduce a relative depth of the first channels and the second channels across the engagement members and generate a torsional spring force which biases the nut in a direction of rotation with respect to the main body.

15. The method of claim 14, further comprising:
determining that the tubing nut fastener is in a torqued state based on a first spatial relationship between a reference mark on the outer surface of the main body and a visual indicator on the nut.

16. The method of claim 15, further comprising:
determining that the tubing nut fastener is in an un-torqued state based on a second spatial relationship between the reference mark and the visual indicator that is different than the first spatial relationship.

17. The method of claim 14, wherein:
the first channels vary in depth along a length.

18. The method of claim 14, wherein:
the second channels vary in depth along a length.

19. The method of claim 14, wherein:
the first channels have centerlines with non-zero angles that are based on a thread pitch of the interior threads.

20. The method of claim 14, wherein:
the second channels have centerlines with non-zero angles that are based on a thread pitch of the interior threads.

* * * * *